US011425298B2

(12) United States Patent
Shimauchi et al.

(10) Patent No.: US 11,425,298 B2
(45) Date of Patent: Aug. 23, 2022

(54) IMAGING DEVICE, IMAGING METHOD, AND PROGRAM

(71) Applicant: SONY CORPORATION, Tokyo (JP)

(72) Inventors: Kazuhiro Shimauchi, Tokyo (JP); Kenzaburo Seki, Tokyo (JP); Tetsuya Shimoda, Tokyo (JP); Yasuyoshi Kuwazoe, Chiba (JP); Yuta Nakao, Kanagawa (JP); Takashi Kohashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/917,441

(22) Filed: Jun. 30, 2020

(65) Prior Publication Data
US 2020/0336652 A1 Oct. 22, 2020

Related U.S. Application Data

(63) Continuation of application No. 16/099,910, filed as application No. PCT/JP2017/021948 on Jun. 14, 2017, now Pat. No. 10,742,872.

(30) Foreign Application Priority Data

Jun. 28, 2016 (JP) .............................. JP2016-127686

(51) Int. Cl.
*H04N 5/232* (2006.01)
*G06T 3/40* (2006.01)
(Continued)

(52) U.S. Cl.
CPC ........... *H04N 5/23219* (2013.01); *G06T 3/40* (2013.01); *G06T 3/4023* (2013.01);
(Continued)

(58) Field of Classification Search
CPC ......... G06T 3/40; G06T 3/4023; H04N 5/232; H04N 5/23212; H04N 5/23219;
(Continued)

(56) References Cited

U.S. PATENT DOCUMENTS 5,883,678 A * 3/1999 Yamaguchi ............ H04N 19/29
375/E7.081
6,178,272 B1 * 1/2001 Segman ................ G06T 3/4007
382/298

(Continued)

FOREIGN PATENT DOCUMENTS

CN 1967566 A 5/2007
CN 101018299 A 8/2007
(Continued)

OTHER PUBLICATIONS

Combined Chinese Office Action and Search Report dated May 29, 2020, in Patent Application No. 201780038247.4 (with English translation), 21 pages.

(Continued)

*Primary Examiner* — Amy R Hsu
(74) *Attorney, Agent, or Firm* — Oblon, McClelland, Maier & Neustadt, L.L.P.

(57) ABSTRACT

The present technology relates to an imaging device, an imaging method, and a program capable of setting a resolution based on a distance to a subject. A control unit which changes a resolution of a captured image on the basis of distance information, corresponding to the captured image, regarding a detected distance to a subject included in the image is included. The control unit changes a resolution of a portion of a region of the captured image on the basis of the distance information. The portion of the region is a region distant from another region. The control unit changes the resolution of the portion of the region such that the (Continued)

portion of the region becomes higher than a resolution of another region.

18 Claims, 22 Drawing Sheets

(51) Int. Cl.
    *H04N 5/341*     (2011.01)
    *H04N 9/04*     (2006.01)
    *H04N 5/345*     (2011.01)

(52) U.S. Cl.
    CPC ..... *H04N 5/23212* (2013.01); *H04N 5/23229* (2013.01); *H04N 5/341* (2013.01); *H04N 5/3456* (2013.01); *H04N 9/045* (2013.01)

(58) Field of Classification Search
    CPC .. H04N 5/23229; H04N 5/341; H04N 5/3456; H04N 9/045
    See application file for complete search history.

(56) References Cited

U.S. PATENT DOCUMENTS

| | | | |
|---|---|---|---|
| 6,664,955 B1* | 12/2003 | Deering | G06T 3/4007 345/428 |
| 10,148,876 B1* | 12/2018 | Ribeiro | H04N 21/8456 |
| 2007/0223887 A1* | 9/2007 | Kanamori | H04N 19/63 375/E7.076 |
| 2008/0088728 A1* | 4/2008 | Omaki | H04N 5/23293 348/E5.079 |
| 2009/0244303 A1* | 10/2009 | Kinoshita | H04N 5/343 348/218.1 |
| 2010/0002074 A1* | 1/2010 | Niem | G06T 3/0012 348/E13.001 |
| 2010/0039525 A1* | 2/2010 | Steinberg | H04N 5/2353 348/222.1 |
| 2012/0113307 A1* | 5/2012 | Watanabe | G06V 20/40 348/333.01 |
| 2013/0113962 A1* | 5/2013 | Li | G06T 5/50 348/240.2 |
| 2014/0232822 A1* | 8/2014 | Venkataraman | G06T 7/60 348/43 |
| 2015/0194128 A1* | 7/2015 | Hicok | G09G 5/36 345/592 |
| 2015/0278997 A1* | 10/2015 | Kim | G06F 16/583 382/195 |
| 2015/0341535 A1* | 11/2015 | Forutanpour | H04N 5/23293 348/222.1 |
| 2016/0133051 A1* | 5/2016 | Aonuma | G02B 27/0172 345/633 |
| 2016/0307054 A1* | 10/2016 | Takemura | G06V 20/56 |
| 2016/0328066 A1* | 11/2016 | Kondoh | G09F 19/228 |
| 2016/0381342 A1* | 12/2016 | Matsuoka | H04N 5/232 348/47 |
| 2017/0251901 A1* | 9/2017 | Miyai | G06T 7/0012 |
| 2017/0264811 A1* | 9/2017 | Ollila | H04N 5/232122 |

FOREIGN PATENT DOCUMENTS

| | | |
|---|---|---|
| JP | 9-23375 A | 1/1997 |
| JP | 2004-32105 A | 1/2004 |
| JP | 2005175719 A | 6/2005 |
| JP | 2006-261871 A | 9/2006 |
| JP | 2009296266 A | 12/2009 |
| JP | 2010-81002 A | 4/2010 |
| JP | 2012-63869 A | 3/2012 |
| JP | 2012248026 A | 12/2012 |
| JP | 2013-46400 A | 3/2013 |
| JP | 2013-251796 A | 12/2013 |
| JP | 2015-2532 A | 1/2015 |
| JP | 2015-195458 A | 11/2015 |
| JP | 2015211302 A | 11/2015 |
| WO | WO 2011/111247 A1 | 9/2011 |
| WO | WO 2015/182753 A1 | 12/2015 |

OTHER PUBLICATIONS

International Search Report dated Aug. 29, 2017 in PCT/JP2017/021948, citing documents AO-AT therein, 2 pages.
Notification of the First Office Action (PCT Application in the National Phase) dated May 29, 2020 in corresponding Chinese Patent Application No. 201780038247.4 (with English translation) (21 pages).

* cited by examiner

FIG. 7
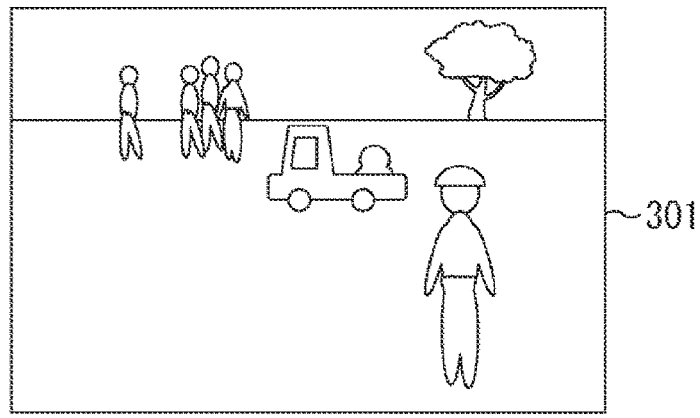

FIG. 12
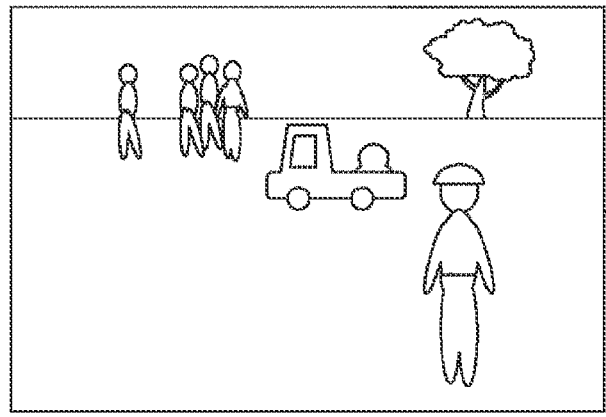
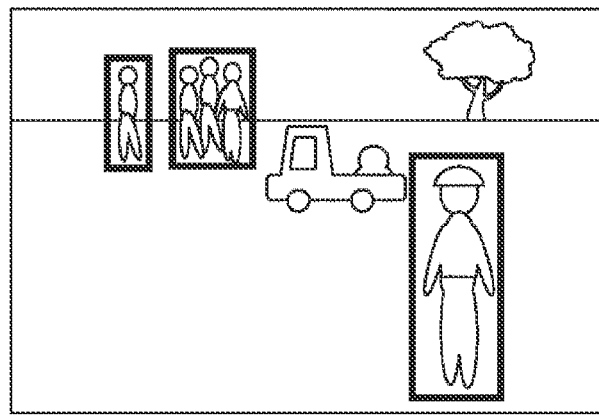
| 10 | 10 | 10 | 10 | 10 | 10 | 10 | 10 |
|----|----|----|----|----|----|----|----|
| 10 | 1  | 2  | 2  | 10 | 10 | 10 | 10 |
| 10 | 1  | 2  | 2  | 10 | 10 | 10 | 10 |
| 10 | 10 | 10 | 10 | 10 | 4  | 4  | 10 |
| 10 | 10 | 10 | 10 | 10 | 4  | 4  | 10 |
| 10 | 10 | 10 | 10 | 10 | 4  | 4  | 10 |
| 10 | 10 | 10 | 10 | 10 | 4  | 4  | 10 |
| 10 | 10 | 10 | 10 | 10 | 10 | 10 | 10 |

IMAGING DEVICE, IMAGING METHOD, AND PROGRAM

CROSS-REFERENCE TO RELATED APPLICATIONS

This application is a continuation of U.S. patent application Ser. No. 16/099,910, filed on Nov. 8, 2018, which is a National Stage Entry of PCT/JP2017/021948, filed on Jun. 14, 2017, claiming priority to Japanese Patent Application No. 2016-127686, filed on Jun. 28, 2016, with the Japan Patent Office. The benefit of priority is claimed to each of the foregoing, and the entire contents of each of the foregoing are incorporated herein by reference.

TECHNICAL FIELD

The present technology relates to an imaging device, an imaging method, and a program, for example, an imaging device, an imaging method, and a program for setting a resolution using features of an image.

BACKGROUND ART

Cameras in the related art image subjects by users focusing on the subjects desired to be imaged or changing a zoom magnification. In addition, there are also cameras continuously performing focusing while tracking subjects even when the subjects move. As related art, the following technology for imaging a moving subject has been proposed.

In an imaging device capable of communicating with a terminal device capable of acquiring positional information, it has been proposed that the imaging device determine whether or not a terminal device is present in an imaging range on the basis of positional information of the imaging device and positional information of the terminal device, and detect a subject on the basis of a feature quantity extracted from a captured image and a feature quantity for detecting a subject wearing the terminal device when the terminal device is present in the imaging range. In addition, it has also been proposed that a focal length be adjusted so as to focus on the detected subject when the subject is detected (see Patent Literature 1).

CITATION LIST

Patent Literature

Patent Literature 1: JP 2013-251796A

DISCLOSURE OF INVENTION

Technical Problem

In recent years, the resolution of captured images has improved, and the amount of data to be processed has been increasing. In addition, for example, the amount of data to be transmitted from an imaging element to a processing unit processing data has also been increasing. With such an increase in the amount of data, a processing load increases, for example, when processing for continuously detecting a subject moving at high speed is performed, which leads to a likelihood that the processing may not be able to follow.

The present technology is contrived in view of such circumstances, and makes it possible to appropriately reduce the amount of data.

Solution to Problem

An imaging device according to an aspect of the present technology includes: a control unit which changes a resolution of a captured image on the basis of distance information, corresponding to the captured image, regarding a detected distance to a subject included in the image.

An imaging method according to an aspect of the present technology includes: a step of changing a resolution of a captured image on the basis of distance information, corresponding to the captured image, regarding a detected distance to a subject included in the image.

A program according to an aspect of the present technology is a program causing a computer to execute a process including: a step of changing a resolution of a captured image on the basis of distance information, corresponding to the captured image, regarding a detected distance to a subject included in the image.

In an imaging device, an imaging method, and a program according to an aspect of the present technology, a resolution of a captured image is changed on the basis of distance information, corresponding to the captured image, regarding a detected distance to a subject included in the image.

Note that the imaging device may be an independent device, or may be an internal block constituting one device.

In addition, the program can be provided by being transmitted through a transmission medium or being recorded in a recording medium.

Advantageous Effects of Invention

According to an aspect of the present technology, it is possible to appropriately reduce the amount of data.

Note that the advantageous effects described here are not necessarily limited and may be any of the advantageous effects described in the present disclosure.

BRIEF DESCRIPTION OF DRAWINGS

FIG. 7 is a diagram illustrating setting of a resolution corresponding to a distance.

FIG. 12 is a diagram illustrating setting of a resolution corresponding to the detection of a person.

MODE(S) FOR CARRYING OUT THE INVENTION

Hereinafter, a mode for implementing the present technology (hereinafter, referred to as an embodiment) will be described.

Figure 1:
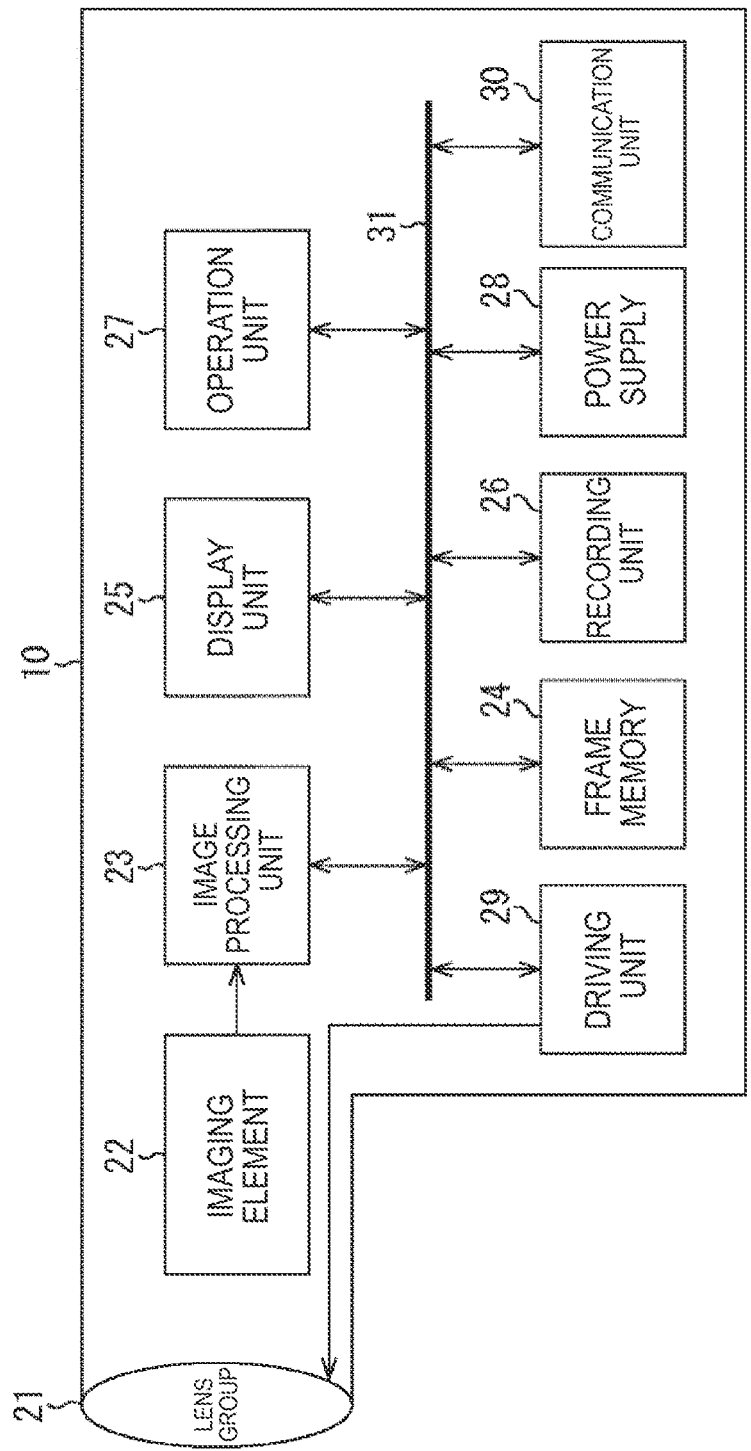
FIG. 1 is a diagram illustrating a configuration which is an embodiment of an imaging device to which the present technology is applied.

FIG. 1 is a block diagram illustrating a configuration example of an imaging device 10 which is an example of an electronic apparatus to which the present technology is applied.

<Configuration of Imaging Device>

As illustrated in FIG. 1, the imaging device 10 includes an optical unit including a lens group 21 and the like, an imaging element 22, an image processing unit 23 which is a camera signal processing unit, a frame memory 24, a display unit 25, a recording unit 26, an operation unit 27, a power supply 28, and the like. In addition, the imaging device is configured such that the image processing unit 23, the frame memory 24, the display unit 25, the recording unit 26, the operation unit 27, the power supply 28, the driving unit 29, and the communication unit 30 are connected to each other through a bus line 31.

The lens group 21 takes in incident light (image light) from a subject to form an image on an imaging surface of the imaging element 22. The imaging element 22 converts the amount of incident light imaged on the imaging surface by the lens group 21 into an electrical signal in units of pixels and outputs the electrical signal obtained by the conversion as a pixel signal.

The display unit 25 is constituted by a panel-type display unit such as a liquid crystal display unit or an organic electro luminescence (EL) display unit, and displays a movie or a still image captured by the imaging element 22. The recording unit 26 records the movie or the still image captured by the imaging element 22 in a recording medium such as a memory card, a video tape, or a Digital Versatile Disk (DVD).

The operation unit 27 gives an operation instruction for various functions of the imaging device 10 in accordance with a user's operation. The power supply 28 appropriately supplies various types of power serving as operation power for the image processing unit 23, the frame memory 24, the display unit 25, the recording unit 26, the operation unit 27, and the driving unit 29 to these objects to be supplied.

The driving unit 29 controls the driving of a lens constituting the lens group 21 to perform control for focusing (so-called auto-focus). The communication unit 30 transmits and receives data to and from another device through a network.

Such an imaging device 10 is applied to a video camera, a digital still camera, and a camera module for a mobile apparatus such as a smartphone or a mobile phone.

The imaging device 10 having such a configuration has a function of changing a resolution in accordance with features of a captured image as will be described below. The features of the captured image include, for example, the distance and the size of a subject as will become apparent in order. In addition, a resolution may be changed such that, for example, the resolution of a distant subject is increased or the resolution of a near subject is lowered.

Note that a resolution may correspond to the size of an image and can be represented by, for example, the number of horizontal pixels and the number of vertical pixels forming one screen. In addition, a resolution can be represented as the number of pixels per unit area with respect to pixels included in image data in units of frames constituting video data.

For example, the number of pixels arranged in a pixel array portion 101 (FIG. 2) of the imaging element 22 can be used as a value representing a resolution. In a case in which the number of pixels of the imaging element 22 is set to be a resolution, the resolution of a captured image may be the same in images. However, according to the present technology, images having different resolutions can be adopted as will be described later.

For example, in one image, the resolutions of some regions may be set to be higher or lower than the resolutions of other regions. Although details will be described later, a resolution at the time of imaging may be set to be the number of pixels of the imaging element 22, and the number of pixels in a predetermined region within a captured image may be reduced (pixels are thinned), whereby the resolution of the region is lowered.

In addition, a resolution at the time of imaging may be set to be the number of pixels of the imaging element 22, and the number of pixels is made to be larger than the number of pixels at the time of imaging by performing processing (processing referred to as up-conversion or the like) for increasing the resolution of a predetermined region within a captured image, whereby the resolution of the region is increased.

In this manner, regarding a resolution in this specification, one image may have a plurality of different resolutions, and thus a change of a resolution may be processing including change of a resolution at the time of imaging performed according to the number of pixels of the imaging element 22. In addition, a change of a resolution in this specification means that the number of pixels in a predetermined region within an image is changed, for example, a change of reducing or increasing the number of pixels may be performed.

Further, in other words, since the amount of data may be reduced due to a change in the number of pixels, for example, a decrease in the number of pixels, it is thereby possible to reduce the amount of data by lowering a resolution. Accordingly, a change of a resolution also means a change of the amount of data.

In this manner, configurations of the imaging element 22 and the image processing unit 23 in the imaging device 10 having a function of changing a resolution in accordance with features of a captured image will be described below. First, an example of a case in which the distance to a subject is used as a feature of a captured image will be described.

<Configurations of Imaging Element and Image Processing Unit>

Figure 2:
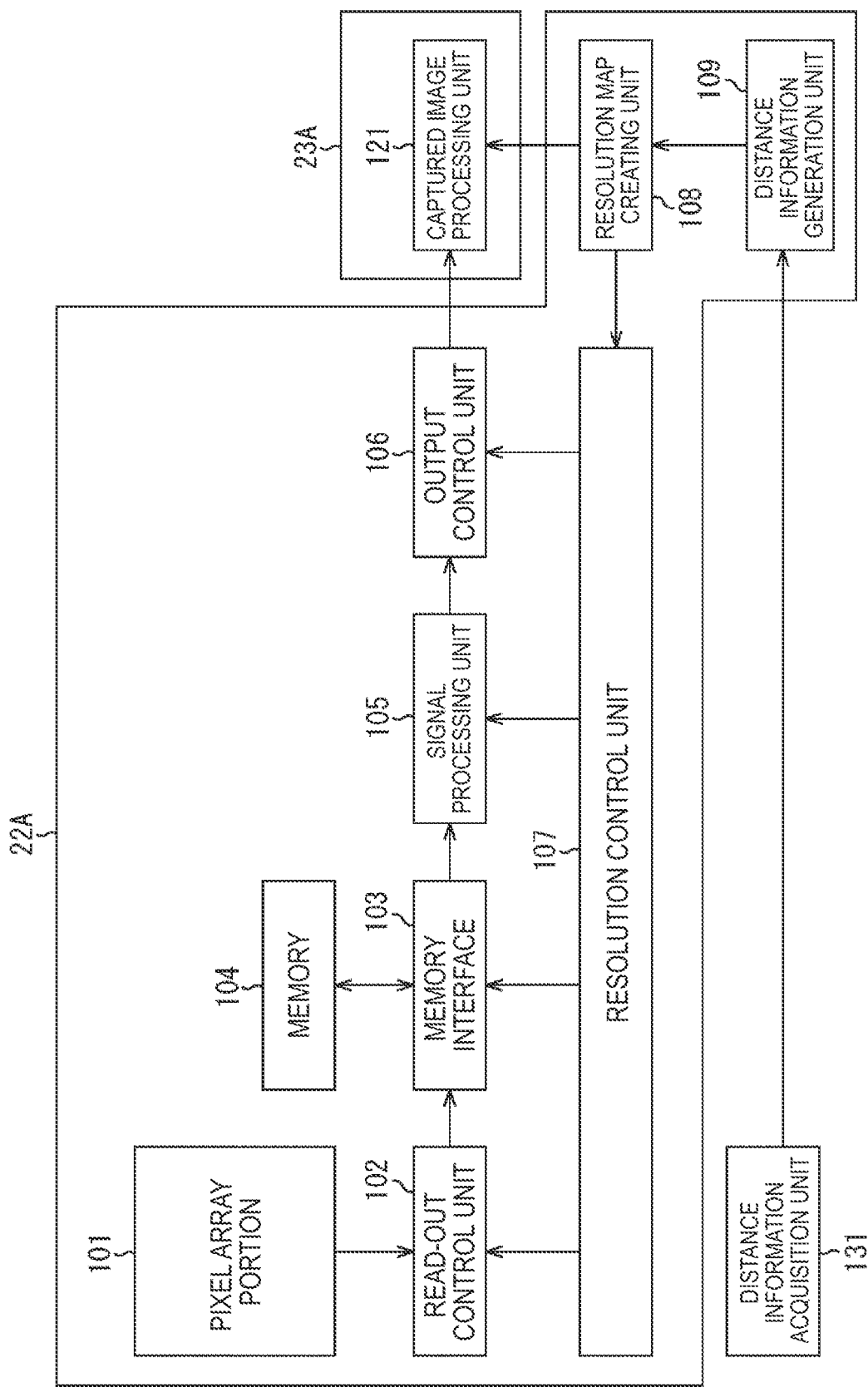
FIG. 2 is a diagram illustrating configuration examples of an imaging element and an image processing unit.

FIG. 2 is a diagram illustrating configuration examples of the imaging element 22 and the image processing unit 23 in a case in which the distance to a subject is used as a feature of a captured image.

An imaging element 22A illustrated in FIG. 2 includes a pixel array portion 101, a read-out control unit 102, a memory interface 103, a memory 104, a signal processing unit 105, an output control unit 106, a resolution control unit 107, a resolution map creating unit 108, and a distance information generation unit 109. An image processing unit 23A includes a captured image processing unit 121 that performs processing such as demosaic processing on a captured image.

The imaging element 22A includes the pixel array portion 101 in which a plurality of Charge Coupled Devices (CCD), Complementary Metal-Oxide Semiconductor (CMOS) elements, or the like are arranged two-dimensionally.

The read-out control unit 102 controls the read-out of a signal from each pixel of the pixel array portion 101. The read-out control unit 102 is configured to be capable of performing control of sequentially reading out signals from all of the pixels constituting the pixel array portion 101 and control of reading out (a signal from a predetermined pixel may not be read out) a signal from a predetermined pixel.

The memory interface 103 performs control of supplying a signal from a pixel read out by the read-out control unit 102 to the memory 104 or control of supplying a signal held by the memory 104 to the signal processing unit 105.

The signal processing unit 105 executes various processing, such as noise removal, on a signal. The output control unit 106 performs control for outputting a signal having been subjected to processing such as noise removal to the image processing unit 23A. The output control unit 106 may be configured to output one stream or may be configured to be capable of outputting N streams in parallel.

The resolution control unit 107 performs control for realizing a set resolution. As described above, a resolution is changed in accordance with features of a captured image, and the resolution control unit 107 controls each of the read-out control unit 102, the memory interface 103, the signal processing unit 105, and the output control unit 106 in order that the changed resolution is obtained.

Control performed by the resolution control unit 107 varies depending on how the set resolution is realized. However, for example, in a case in which a resolution is lowered, the resolution can be lowered by setting the number of pixels of the pixel array portion 101 from which a signal is read out to be smaller than that in a normal case, and the resolution control unit 107 controlling the read-out control unit 102 so that such read-out is performed.

For example, it is possible to lower a resolution to a half by reading out the number of pixels which is half the number of pixels of the pixel array portion 101. When such control is performed, so that the number of signals (the amount of data) supplied from the read-out control unit 102 to the memory interface 103 and the subsequent units is reduced, it is thus possible to reduce a processing load on each unit.

In addition, as will be described later, a resolution may be lowered by reading out signals corresponding to all of the pixels from the pixel array portion 101 and generating new pixel values by performing addition, division, or the like on the read-out signals. In this case, for example, signals corresponding to all of the pixels are temporarily held in the memory 104 and processing such as addition or division is performed on the signals to generate new pixel values, and the generated new pixel values are output to the signal processing unit 105. According to such processing, for example, an image having half the number of pixels is generated.

In a case in which control is performed in this manner, the number of signals supplied from the memory interface 103 to the signal processing unit 105 is reduced, and thus it is possible to reduce a processing load on the signal processing unit 105 and the subsequent units.

It is also possible to lower a resolution with respect to the entire image to be generated and to lower a resolution for each of predetermined regions (pixels) of the image. Lowering of a resolution for each predetermined region of the image means that regions having different resolutions such as a region having a resolution A, a region having a resolution B, and a region having a resolution C may be present in one image, and means that a different resolution can be set for each region.

Here, a description for each region is given, but it is also possible to give a description for each pixel. A change of a resolution of for each pixel means that a signal is read out or is not read out from a predetermined pixel. In addition, it is also possible to change a resolution for each image. For example, when a video is captured, it is also possible to set a different resolution for each frame.

In addition, here, a case in which a resolution is lowered will be described as an example. In such a case, processing is performed with a high resolution in a normal case, and a resolution becomes lower than the resolution in a normal case due to features of a captured image. In other words, imaging is performed with a high resolution, and a resolution within a predetermined region in an image having this high resolution is lowered. In this manner, an image having a region with a high resolution and a region with a lowered resolution in one image is generated.

An example of such a case will be described, but the present technology can also be applied in a case of an inverse pattern. That is, it is also possible to perform processing with a low resolution in a normal case and to make a resolution become higher than the resolution in a normal case due to features of a captured image.

In addition, it is also possible to perform processing with a medium resolution in a normal case and to make a resolution become higher or lower than the resolution in a normal case due to features of a captured image.

Description will return to FIG. 2. The resolution map creating unit 108 sets a resolution in one image in accordance with distance information received from the distance information generation unit 109. That is, a region in which a resolution is lowered in one image is set. Since the setting is performed in accordance with a distance to a subject, the distance information generation unit 109 generates distance information of the subject and supplies the generated distance information to the resolution map creating unit 108.

The distance information generation unit 109 generates distance information using information received from the distance information acquisition unit 131. In the distance information acquisition unit 131 and the distance information generation unit 109, a distance to a subject is measured, but the measurement can be performed by a distance measurement sensor using, for example, active light (infrared light or the like). For the distance measurement sensor using active light, a Time-of-Flight (TOF) system, a Structured Light system, or the like can be applied.

In addition, a stereo camera may be used as the distance information acquisition unit 131, and the distance information generation unit 109 may generate distance information using an image captured by the stereo camera. In addition, a multi-camera may be used as the distance information acquisition unit 131, and distance information may be generated using a method based on a three-dimensional reconstruction using the multi-camera.

In addition, the distance information acquisition unit 131 may be configured to acquire distance information using an ultrasound sensor. In addition, the distance information acquisition unit 131 may be configured to acquire distance information by a method using a millimeter wave radar. In addition, a method using a light field camera can also be applied.

In addition, the distance information acquisition unit 131 may be set to be a pixel for phase difference detection, and the distance information generation unit 109 may generate distance information using a signal from the pixel for phase difference detection. In a case in which distance information is generated using the signal from the pixel for phase difference detection, the pixel for phase difference detection can be provided in the pixel array portion 101. In addition, focus detection processing may also be performed using the signal from the pixel for phase difference detection.

In this manner, distance information is acquired and generated by the distance information acquisition unit 131 and the distance information generation unit 109. Depending on a configuration (by which method distance measurement is performed), the distance information acquisition unit 131 may be configured to be included in the imaging element 22A or may be provided separately from the imaging element 22A.

Figure 3:
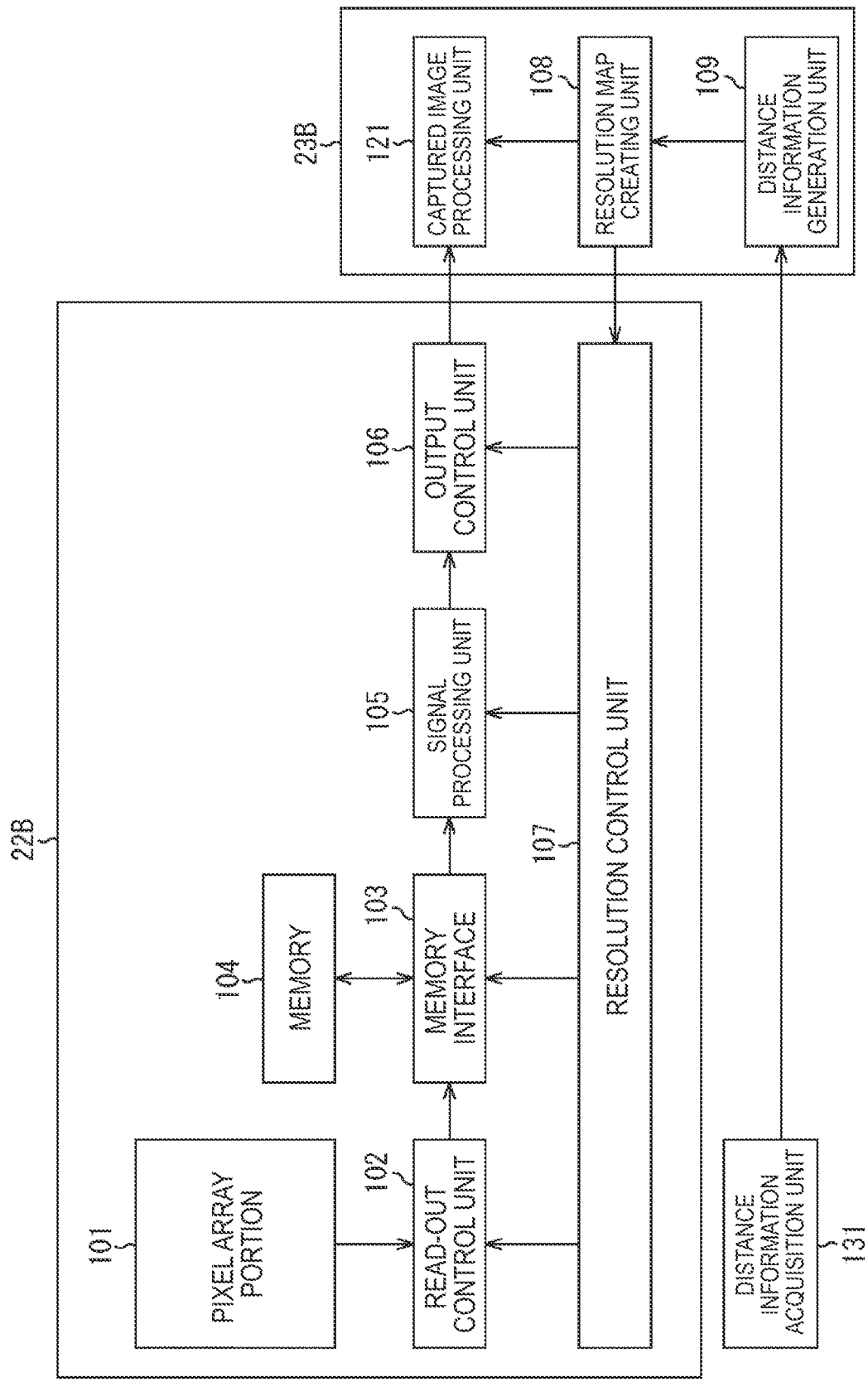
FIG. 3 is a diagram illustrating another configuration example of each of an imaging element and an image processing unit.

FIG. 3 illustrates another configuration example of each of the imaging element 22 and the image processing unit 23. In the configuration illustrated in FIG. 3, the same components as those illustrated in FIG. 2 are denoted by the same reference numerals and signs, and a description thereof will be appropriately omitted.

Comparing configurations of an imaging element 22B and an image processing unit 23B illustrated in FIG. 3 with configurations of the imaging element 22A and the image processing unit 23A illustrated in FIG. 2, the internal configurations thereof are different from each other. The imaging element 22B illustrated in FIG. 3 is configured to include a pixel array portion 101, a read-out control unit 102, a memory interface 103, a memory 104, a signal processing unit 105, an output control unit 106, and a resolution control unit 107.

The image processing unit 23B illustrated in FIG. 3 is configured to include a resolution map creating unit 108, a distance information generation unit 109, and a captured image processing unit 121. The configuration illustrated in FIG. 3 is different from the configuration illustrated in FIG. 2 in that the resolution map creating unit 108 and the distance information generation unit 109 included in the imaging element 22A are included in the image processing unit 23B.

In this manner, functions constituting the imaging element 22 and the image processing unit 23 can be allocated to the imaging element 22 or the image processing unit 23.

The configurations of the imaging element 22A and the image processing unit 23A illustrated in FIG. 2 or the configurations of the imaging element 22B and the image processing unit 23B illustrated in FIG. 3 are configurations in which a resolution is changed on the imaging element 22A side. In a case in which such configurations are adopted, the amount of data to be supplied from the imaging element 22A to the image processing unit 23A is reduced according to a degree by which a resolution is set to be lowered when a low resolution is set.

Next, a case in which a configuration in which a resolution is changed on the image processing unit 23 side will be described. In a case in which such a configuration is adopted, the amount of data to be output from the image processing unit 23 is reduced according to a degree by which a resolution is set to be lowered when a low resolution is set. Therefore, it is possible to reduce the amount of data flowing through a network, for example, when the data is supplied to another device through the network, or the like.

Figure 4:
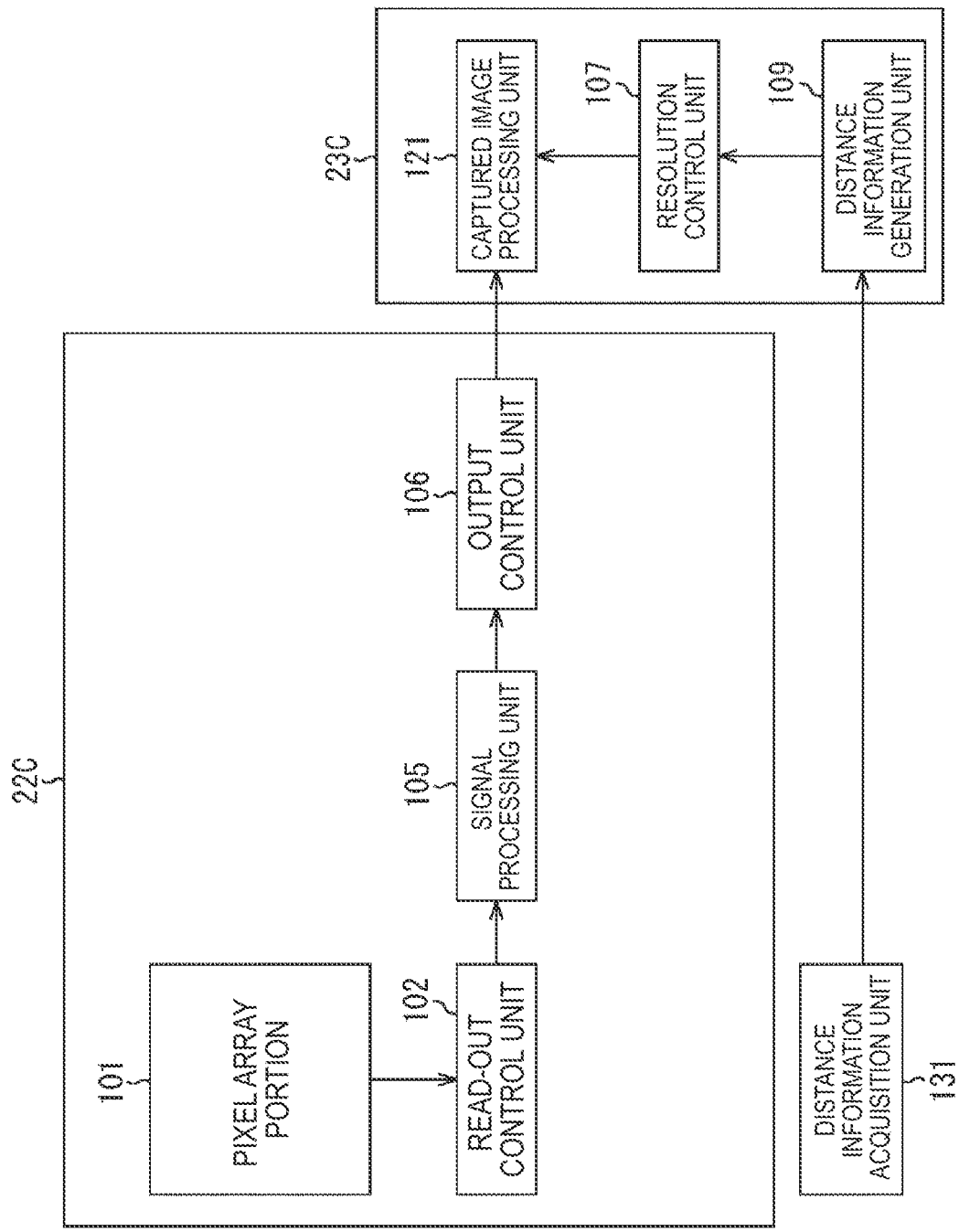
FIG. 4 is a diagram illustrating another configuration example of each of an imaging element and an image processing unit.

FIG. 4 is a diagram illustrating configuration examples of the imaging element 22 and the image processing unit 23 in a case in which a resolution is changed on the image processing unit 23 side. In the configuration illustrated in FIG. 4, the same components as those illustrated in FIG. 2 are denoted by the same reference numerals and signs, and a description thereof will be appropriately omitted.

An imaging element 22C illustrated in FIG. 4 is configured to include a pixel array portion 101, a read-out control unit 102, a signal processing unit 105, and an output control unit 106. The imaging element 22C illustrated in FIG. 4 does not have a function of changing a resolution, and is thus configured such that, for example, the memory interface 103, the memory 104, and the resolution control unit 107 are omitted from the imaging element 22A illustrated in FIG. 2.

Note that, here, although description will continue on the assumption that a memory 14 is provided to temporarily hold signals in order to perform a process of changing a resolution, a configuration may be, of course, adopted in which a memory interface 103 and a memory 14 are included in a case in which a mechanism for temporarily holding signals is also desired to be provided for processes other than the process of changing a resolution, or the like.

The image processing unit 23C illustrated in FIG. 4 is configured to include a resolution control unit 107, a distance information generation unit 109, and a captured image processing unit 121. Distance information generated by the distance information generation unit 109 is supplied to the resolution control unit 107.

The resolution control unit 107 thins out pixels in an image to be processed by the captured image processing unit 121 in accordance with a resolution and outputs a result of the thinning-out to a processing unit in a latter stage, for example, a communication unit (not shown) communicating with another device, or the like through the network.

In a case of such configuration, for example, it is possible to output image data processed by the image processing unit 23C to the network through the communication unit 30 and to reduce the amount of data when the data is output to another device through the network.

The imaging element 22 and the image processing unit 23 illustrated in FIGS. 2 to 4 can be constituted by a stacked image sensor in which a plurality of substrates (dies) are stacked. Here, a description will be given of a case in which the imaging element 22 and the image processing unit 23 are constituted by a stacked image sensor using the imaging element 22 and the image processing unit 23 illustrated in FIG. 2 or 3 as examples.

Figure 5:
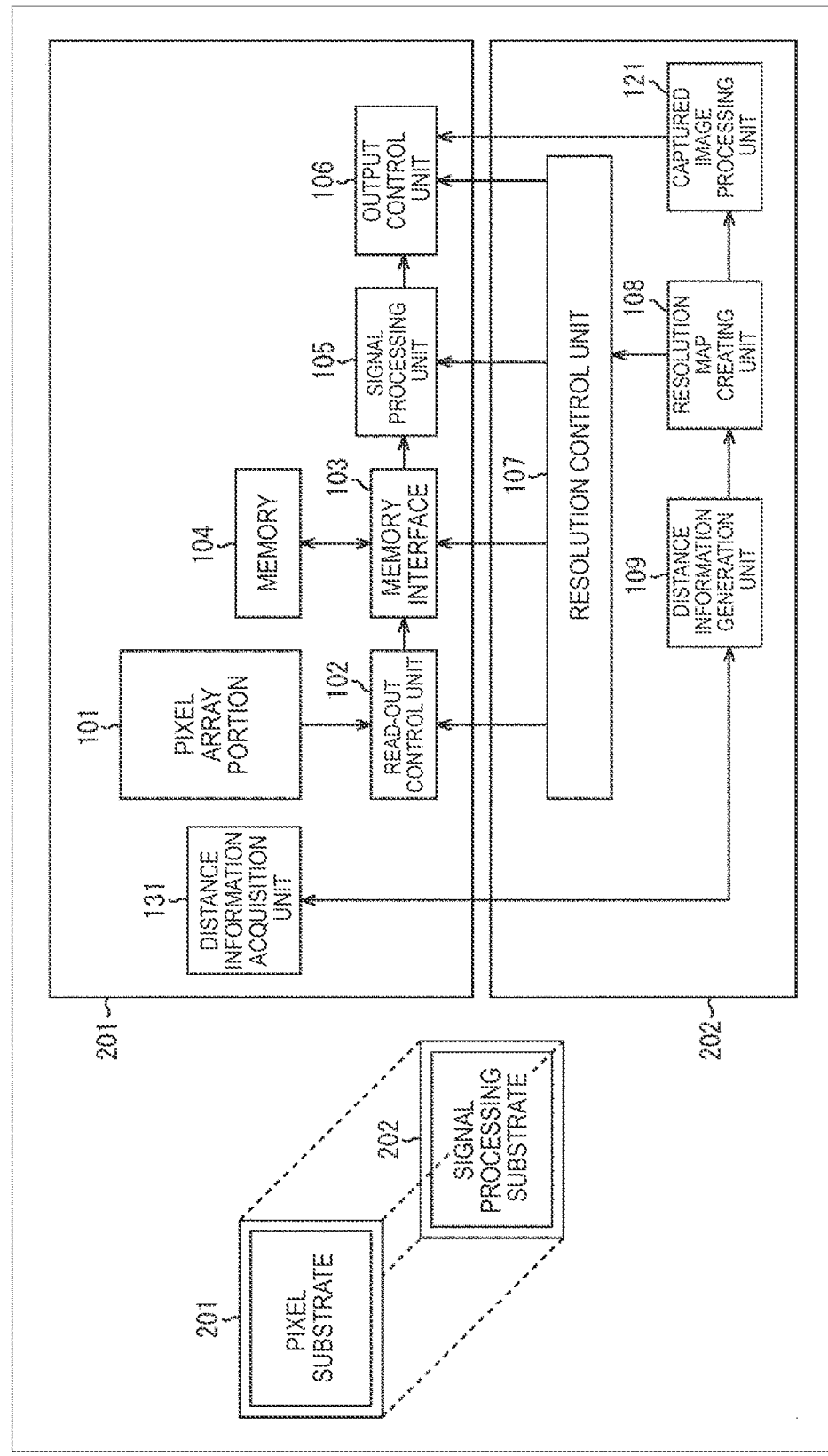
FIG. 5 is a diagram illustrating a stacked structure.

FIG. 5 is a diagram illustrating a configuration example of a stacked image sensor in which all of the imaging element 22 and the image processing unit 23 of FIG. 3 are built in. The stacked image sensor of FIG. 5 has a two-layer structure in which a pixel substrate 201 and a signal processing substrate 202 are stacked on each other.

The pixel array portion 101, the read-out control unit 102, the memory interface 103, the memory 104, the signal processing unit 105, and the output control unit 106 included in the imaging element 22 are formed on the pixel substrate 201. In addition, the distance information acquisition unit 131 is also formed on the pixel substrate 201.

In a case in which distance information is obtained using, for example, a TOF system, the distance information acquisition unit 131 is configured to include an irradiation unit irradiating a subject with predetermined light and an imaging element receiving the irradiation light. It is possible to form portions on the pixel substrate 201 inclusive of a portion of the imaging element constituting the distance information acquisition unit 131 or a portion such as the irradiation unit. Further, also in a case in which the distance information acquisition unit 131 is formed by a pixel for phase difference detection, and the like, the distance information acquisition unit 131 is formed on the pixel substrate 201.

The resolution control unit 107, the resolution map creating unit 108, the distance information generation unit 109, and the captured image processing unit 121 are formed on the signal processing substrate 202.

In this manner, the imaging element 22 and the image processing unit 23 may be formed as a stacked image sensor. Note that a change can be appropriately made such that only the imaging element 22 is configured as a stacked image sensor.

In addition, the stacked image sensor can be configured as a stacked substrate of four or more layers in addition to a two-layer substrate or a three-layer substrate. For example, the memory 104 is provided on a layer (memory layer) other than the pixel substrate 201 and the signal processing substrate 202, and the memory layer may be configured to be provided between the pixel substrate 201 and the signal processing substrate 202 or below the signal processing substrate 202.

<Change of Resolution Based on Distance>

Reference will be made to a flowchart of FIG. 6 to describe a case in which a resolution is changed on the basis of a distance in the configurations of the imaging element 22 and the image processing unit 23 illustrated in FIGS. 2 to 4.

In step S101, distance information is generated. The distance information generation unit 109 (for example, FIG. 3) generates distance information on the basis of information to be acquired by the distance information acquisition unit 131 (FIG. 3). The distance information can be generated by applying a TOF system or the like as described above.

In step S102, a resolution map is created. The resolution map creating unit 108 creates the resolution map on the basis of the distance information generated by the distance information generation unit 109. The resolution map is a map useful as information in which a region (pixel) in which a resolution is not desired to be lowered and a region (pixel) which is not useful as information and in which a resolution is desired to be lowered in an image are written.

Further, in a case in which a resolution is set in units of frames, a resolution map is set to be a map in which a resolution in a frame (image) is set to be uniformly high in a case of the frame which is useful as information and in which a resolution is not desired to be lowered, and is set to be a map in which a resolution in a frame (image) is set to be uniformly low in a case of the frame which is not useful as information and in which a resolution is lowered.

The distance information generation unit 109 generates, for example, a depth map (depth map) as distance information, and the resolution map creating unit 108 may generate a resolution map by detecting a region having a predetermined threshold value or less and a region having the predetermined threshold value or greater in the generated depth map. A configuration may also be adopted in which a plurality of resolutions are set by providing a plurality of threshold values.

In step S103, a thinning-out rate is adjusted on the basis of the resolution map to generate a captured image (output data). The thinning-out rate is a rate which is set to achieve a set resolution, and has a value as described with reference to FIG. 7.

A description of such processing will be further added with reference to FIG. 7. A of FIG. 7 illustrates an example of a captured image (set to be an input image 301). In the input image 301, four persons are imaged on the upper left side, and one person is imaged in the front. Further, in the input image 301, a tree is imaged on the upper right side, and a car is imaged at the center.

In a case in which, for example, a depth map is generated from distance information when such input image 301 is acquired, a distance image 302 as illustrated in B of FIG. 7 is obtained. In B of FIG. 7, a darker color (close to black) means a longer distance, and a lighter color (close to white) means a shorter distance.

Note that the distance is a distance from the imaging device 10, and for example, the short distance means that a distance from the imaging device 10 to a subject is short. Alternatively, the distance may be a distance in a relative positional relationship between subjects in an image. It may be determined that the distance is long in a case in which a predetermined subject is set as a reference and another is separated from the reference subject, and it may be determined that the distance is short in a case in which another subject is close to the reference subject. Nearness and distantness can be relatively determined using the predetermined subject as a reference.

In addition, the distance may be absolute distance information obtained in accordance with detection performed through processing of the distance information acquisition unit 131 and the distance information generation unit 109. The distance information may be, for example, an imaging distance. For example, the imaging distance is obtained using 10 meters as a reference, and it can be determined that a distance is long for a subject positioned farther than 10 meters and a distance is short for a subject positioned closer than 10 meters.

The reference imaging distance is not limited to 10 meters, and may be set to any value or may vary depending on an imaging scene. For example, in a case in which a distant view is imaged like a near view by zooming or the like, it may be determined that a distance is short for the entire image, and processing may be performed with a resolution obtained when a distance is short.

In a case in which the distance image 302 as illustrated in B of FIG. 7 is obtained as distance information, a resolution is set for each pixel (a region having a predetermined size) of the distance image 302. C of FIG. 7 illustrates an example in which a resolution is set for each region having a predetermined size, and is a diagram illustrating an example of a resolution map.

C of FIG. 7 illustrates that the smaller a numerical value is, the lower a thinning-out rate is, and the larger a numerical value is, the higher a thinning-out rate is. In other words, C of FIG. 7 illustrates that the smaller a numerical value is, the higher a resolution is, and the larger a numerical value is, the lower a resolution is.

Referring to a resolution map 303 illustrated in C of FIG. 7, a thinning-out rate in a near region (near view) is set to be high (large as a numerical value, and a resolution is set to be low), and a thinning-out rate in a distant region (distant view) is set to be low (small as a numerical value, and a resolution is set to be high).

There is a strong likelihood that a subject in a distant view may be imaged in a small size, and there is a likelihood that the subject may not be visually recognized when the region of the subject in a distant view is thinned out (resolution is lowered). Accordingly, the resolution of the subject in a distant view is maintained or increased (a thinning-out rate is set to be low).

In addition, there is a strong likelihood that the subject in a distant view may be imaged in a small size, and there is a likelihood that the subject having a small size may be changed to a larger size so as to be visually recognized. Such a region which is likely to be enlargedly displayed after being imaged is imaged with a high resolution, and is viewed so as to be enlargedly displayed at a later point in time. Accordingly, the resolution of the subject in a distant view is maintained or increased (a thinning-out rate is set to be low).

On the other hand, there is a strong likelihood that a subject in a near view may be imaged in a large size, and there is a slim likelihood that the subject may not be visually recognized even when the region of the subject in a near view is thinned out (resolution is lowered). Accordingly, the resolution of the subject in a near view is lowered (a thinning-out rate is set to be high).

Alternatively, in reverse, the resolution of the subject in a near view may be increased, and the resolution of the subject in a distant view may be lowered. For example, in a case where only the subject in a near view is set to be an object to be processed, it is possible to perform change such that the resolution of the subject in a near view is increased and the resolution of the subject in a distant view is lowered.

In this manner, how to set a resolution can be appropriately changed in accordance with the purpose of changing a resolution.

Referring to the resolution map 303 illustrated in C of FIG. 7, a plurality of numerical values are set in the resolution map 303. That is, a resolution (thinning-out rate) is set for each of a plurality of regions with respect to one image. In this case, a resolution (thinning-out rate) is set in accordance with a distance to a subject.

In the resolution map 303 illustrated in C of FIG. 7, numerical values of 1 to 8 are set. In this case, a case in which resolutions of eight levels are set is shown. The number of levels may be arbitrary, and a plurality of resolutions (a plurality of thinning-out rates) can be set.

For example, in a case in which 100 pixels of 10×10 are set to be an object to be processed, all of 100 pixels within a region having a numerical value of "1" set therein are read out and a resolution is maintained, for example, within the resolution map 303 illustrated in C of FIG. 7. In addition, for example, within the resolution map 303 illustrated in C of FIG. 7, 80% of pixels (80 pixels) are thinned out from a region having a numerical value of "8" set therein, 20 pixels present at a predetermined position are read out from 100 pixels, and a resolution is lowered.

In this manner, a resolution map is created from distance information, and a resolution is controlled on the basis of the resolution map.

In the imaging element 22 and the image processing unit 23 illustrated in FIG. 2 or 3, in a case in which the resolution control unit 107 controls a resolution on the basis of a resolution map, the resolution control unit 107 gives an instruction to, for example, the read-out control unit 102 and controls the number of pixels to be read out from the pixel array portion 101 to control a resolution.

For example, as in the above-described example, 20 pixels present at a predetermined position are set to be pixels to be read out from 100 pixels within a region having a numerical value of "8" set therein within the resolution map 303 illustrated in C of FIG. 7, and pixel values are read out from the set pixels. In this case, a resolution is controlled by controlling reading-out performed by the read-out control unit 102.

Alternatively, the resolution control unit 107 gives an instruction to the memory interface 103 and controls data output from the memory interface 103 to the signal processing unit 105 to control a resolution.

For example, as in the above-described example, 20 pixels present at a predetermined position are set to be pixels to be output to the signal processing unit 105 from 100 pixels within a region having a numerical value of "8" set therein within the resolution map 303 illustrated in C of FIG. 7, and pixel values read out from the set pixels are read out from the memory 104 and output to the signal processing unit 105. In this case, a resolution is controlled by controlling reading-out performed by the memory interface 103.

Alternatively, the resolution control unit 107 may give an instruction to the memory interface 103 and the memory 104 and control data output from the memory interface 103 to the signal processing unit 105 to control a resolution.

For example, as in the above-described example, in a case in which 20 pixels present at a predetermined position are set to be pixels to be output to the signal processing unit 105 from 100 pixels within a region having a numerical value of "8" set therein within the resolution map 303 illustrated in C of FIG. 7, pixel values corresponding to 20 pixels are generated from pixel values corresponding to 100 pixels held in the memory 104 (the generation will be described later with reference to FIG. 8).

The generated pixel values corresponding to 20 pixels are read out from the memory 104 and output to the signal processing unit 105. In this case, a resolution is controlled by controlling the memory interface 103 and the memory 104.

Such thinning-out processing such as the generation of pixel values of 20 pixels from pixel values of 100 pixels can also be performed by the signal processing unit 105. In a case in which thinning-out processing is performed by the signal processing unit 105, the resolution control unit 107 gives an instruction to the signal processing unit 105, and the signal processing unit 105 performs thinning-out processing (processing including addition, division, and the like of pixel values), and data to be output is controlled, whereby a resolution is controlled.

Alternatively, the resolution control unit 107 may give an instruction to the output control unit 106 and may control data to be output from the output control unit 106 to the image processing unit 23 to control a resolution.

For example, as in the above-described example, in a case in which 20 pixels present at a predetermined position are set to be pixels to be output to the image processing unit 23 from 100 pixels within a region having a numerical value of "8" set therein within the resolution map 303 illustrated in C of FIG. 7, pixel values of 100 pixels are supplied to the output control unit 106 from the signal processing unit 105, and the output control unit 106 outputs pixel values corresponding to 20 pixels to the image processing unit 23 from the supplied pixel values of 100 pixels. In this case, a resolution is controlled by controlling the output control unit 106.

In the imaging element 22C and the image processing unit 23C illustrated in FIG. 4, in a case in which a resolution is controlled on the basis of a resolution map, the resolution control unit 107 gives an instruction to the captured image processing unit 121 and controls the number of pixels to be output from the captured image processing unit 121 to the bus line 31, so that a resolution can be controlled.

For example, as in the above-described example, in a case in which pixel values corresponding to 20 pixels are output from 100 pixels within a region having a numerical value of "8" set therein within the resolution map 303 illustrated in C of FIG. 7, pixel values corresponding to 100 pixels are supplied to (the captured image processing unit 121 within) the image processing unit 23 from the imaging element 22C. The captured image processing unit 121 thins out 80 pixels from the supplied 100 pixels on the basis of the instruction given from the resolution control unit 107 and outputs the pixel values corresponding to 20 pixels. In this manner, a resolution may be controlled by controlling the captured image processing unit 121.

A case in which pixel values are temporarily held in the memory 104 and pixels are thinned out will be described with reference to FIG. 8.

As illustrated in A of FIG. 8, a case in which eight horizontal pixels and two vertical pixels are processed will be described as an example. In addition, here, a description will continue using a case in which a color arrangement (color filter) is a Bayer array of RGB (Red, Green, Blue) as an example, but the present technology does not describe that an application range is limited to such color arrangement.

For example, 2×2 pixels in the horizontal and vertical directions are set to be a repetitive unit, and the present technology can be applied also in a case in which red (R)/green (G)/blue (B)/transparent (C) color filters are arranged or a case in which red (R)/transparent (C)/transparent (C)/transparent (C) color filters are arranged in the repetitive unit.

Figure 8:
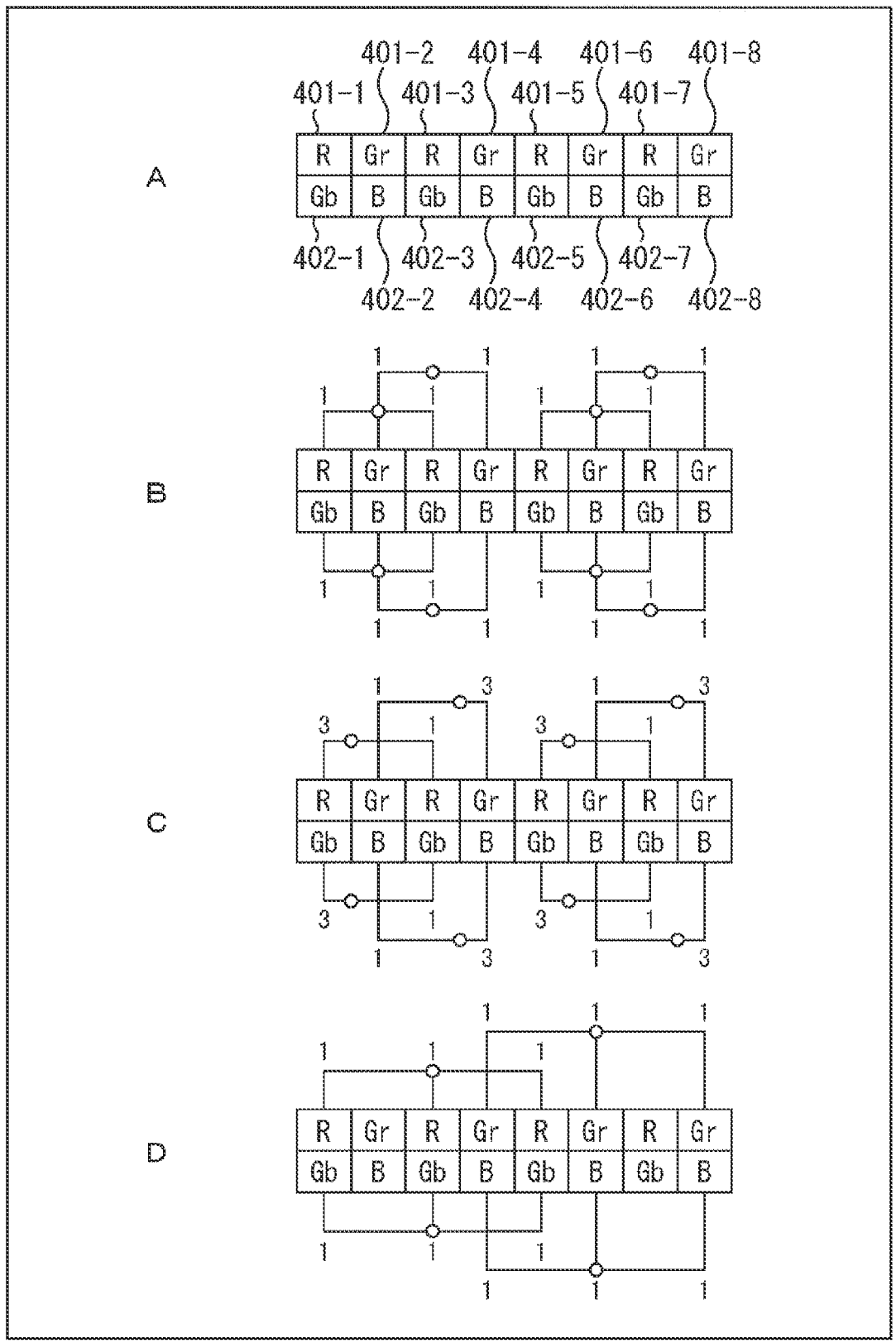
FIG. 8 is a diagram illustrating thinning-out processing.

In a case of a region in which a resolution is maintained and thinning-out is not performed, in other words, a region in which the reading-out of all pixels is performed, all pixels are read out as illustrated in A of FIG. 8. That is, in this case, pixel values are read out from pixels 401-1 to 401-8 and pixels 402-1 to 402-8.

In a case of the reading-out of all pixels, pixel values of the pixels 401-1 to 401-8 and the pixels 402-1 to 402-8 are read out from the pixel array portion 101 and temporarily held in the memory 104. Thereafter, the pixel values of the pixels 401-1 to 401-8 and the pixels 402-1 to 402-8 are read out from the memory 104 and supplied to the signal processing unit 105 under the control of the memory interface 103.

In a case of a region in which a resolution is lowered, for example, a region in which thinning-out to half is performed, addition and division are performed, for example, as illustrated in B of FIG. 8, and thus pixel values corresponding to 2 pixels are converted into a pixel value corresponding to one pixel. In the example illustrated in B of FIG. 8, for example, pixel values of an R pixel 401-1 and an R pixel 401-3 are added up and divided by 2, and thus an obtained value is converted into a pixel value of an R pixel corresponding to one pixel.

That is, a pixel value is calculated by calculating an average value of pixel values of the adjacent same colors. Similarly, regarding G pixels and B pixels other than the R pixels, a pixel value is calculated by obtaining an average value.

Note that, here, although thinning-out in the horizontal direction is described, thinning-out in the vertical direction can be performed in the same manner as the thinning-out in the horizontal direction. Here, thinning-out in the horizontal direction is described, and thinning-out in the vertical direction is performed in the same manner as the thinning-out in the horizontal direction and will not described.

In a case of a region in which a resolution is lowered, for example, a region in which thinning-out to half is performed, addition and division are performed, for example, as illustrated in C of FIG. 8, and thus pixel values corresponding to 2 pixels may be converted into a pixel value corresponding to one pixel. In the example illustrated in C of FIG. 8, for example, pixel values of an R pixel 401-1 and an R pixel 401-3 are added up at a ratio of 3:1 and divided by 4, and thus an obtained value is converted into a pixel value of an R pixel corresponding to one pixel.

That is, in this case, weighted addition is performed, and the weighted addition value is divided to generate a pixel value corresponding to one pixel. In a case of an R pixel, the proportion of an R pixel (for example, the R pixel 401-1) positioned on the left side, among adjacent R pixels, is set to 3 the proportion of an R pixel (for example, the R pixel 401-3) positioned on the right side is set to 1, and addition thereof is performed.

2×2 pixels, which are G pixels, in the horizontal and vertical directions are set to be a repetitive unit. In a case of a Gr pixel positioned on the upper right side in the repetitive unit, the proportion of a Gr pixel (for example, a Gr pixel 401-2) positioned on the left side, among adjacent Gr pixels, is set to 1 and the proportion of a Gr pixel (for example, a Gr pixel 401-4) positioned on the right side is set to 1, and addition thereof is performed.

2×2 pixels, which are G pixels, in the horizontal and vertical directions are set to be a repetitive unit. In a case of a Gb pixel positioned on the lower left side in the repetitive unit, the proportion of a Gb pixel (for example, a Gb pixel 402-1) positioned on the left side, among adjacent Gb pixels, is set to 3 and the proportion of a Gb pixel (for example, a Gb pixel 402-3) positioned on the right side is set to 1, and addition thereof is performed.

In a case of a B pixel, the proportion of a B pixel (for example, a B pixel 402-2) positioned on the left side, among adjacent B pixels, is set to 1 and the proportion of a B pixel (for example, a B pixel 402-4) positioned on the right side is set to 1, and addition thereof is performed.

In this manner, weighting is performed at the time of the addition. In this case, weighting of 3:1 or 1:3 may be performed. Naturally, another weighting may be performed.

In a case of a region in which a resolution is lowered, for example, a region in which thinning-out to one third performed, addition and division are performed, for example, as illustrated in D of FIG. 8, and thus pixel values corresponding to three pixels are converted into a pixel value corresponding to one pixel. In the example illustrated in D of FIG. 8, for example, pixel values of three pixels of an R pixel 401-1, an R pixel 401-3, and an R pixel 401-5 are added up and divided by 3, and thus an obtained value is converted into a pixel value of an R pixel corresponding to one pixel.

That is, a pixel value corresponding to one pixel is calculated by calculating an average value of pixel values of the adjacent three pixels of the same color. Similarly, regarding G pixels and B pixels other than the R pixels, a pixel value is calculated by obtaining an average value.

Here, a case of a thinning-out rate for reducing the number of pixels to half and one third has been described as an example. However, similarly, other thinning-out rates can be calculated by obtaining an average value or calculated by performing weighted addition and division.

Note that an average value is an example, weighting may be performed as described above, and thinning-out processing is not limited to the above-described method. Thinning-out processing may be performed by other methods.

<Change of Resolution Based on Detection of Moving Body>

In the above-described embodiment, a case in which a resolution is changed on the basis of a distance has been described. A configuration may also be adopted in which a resolution is changed on the basis of information other than a distance. Hereinafter, a case in which a resolution is changed on the basis of information other than a distance will be described. First, a case in which a moving body is detected and a resolution is changed on the basis of the detected moving body will be described.

Figure 9:
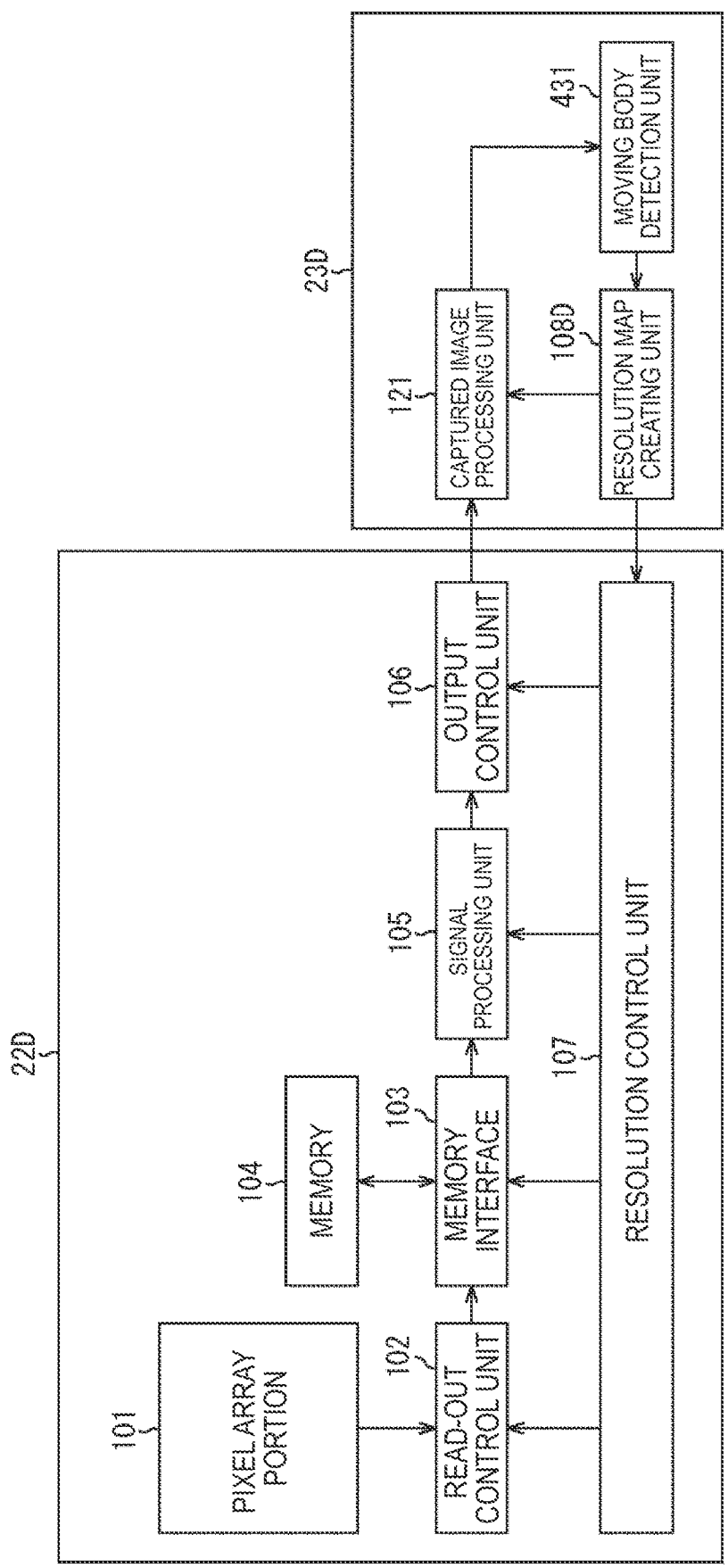
FIG. 9 is a diagram illustrating another configuration example of each of an imaging element and an image processing unit.

FIG. 9 is a diagram illustrating configuration examples of the imaging element 22 and the image processing unit 23 when adopting a configuration in which a resolution is changed on the basis of detection of a moving body. In a configuration of each of an imaging element 22D and an image processing unit 23D illustrated in FIG. 9 and a configuration of each of the imaging element 22B and the image processing unit 23B illustrated in FIG. 3, the same components are denoted by the same reference numerals and signs, and a description thereof will be appropriately omitted.

Note that although a description will be given of an example of configurations of the imaging element 22 and the image processing unit 23 in a case in which a resolution is changed on the basis of information other than a distance to be described below are configurations based on the configurations of the imaging element 22B and the image processing unit 23B illustrated in FIG. 3, the configurations may be configurations based on the configurations of the imaging element 22A and the image processing unit 23A illustrated in FIG. 2 or may be configurations based on the configurations of the imaging element 22C and the image processing unit 23C illustrated in FIG. 4.

The imaging element 22D illustrated in FIG. 9 has the same configuration as that of the imaging element 22B illustrated in FIG. 3. The image processing unit 23D illustrated in FIG. 9 is different from the image processing unit 23B illustrated in FIG. 3 in that the distance information generation unit 109 of the image processing unit 23B is replaced with a moving body detection unit 431.

The moving body detection unit 431 of the image processing unit 23D illustrated in FIG. 9 detects a moving body using a captured image processed by the captured image processing unit 121. The resolution map creating unit 108D creates a resolution map on the basis of the moving body (the region of the moving body) which is detected by the moving body detection unit 431.

Note that, here, although a description will continue on the assumption that the moving body detection unit 431 detects a moving body using a captured image processed by the captured image processing unit 121, a configuration can also be adopted in which the moving body detection unit 431 detects a moving body using a captured image to be directly supplied from the imaging element 22D. That is, a configuration can also be adopted in which the moving body detection unit 431 receives the supply of a captured image from a unit other than the captured image processing unit 121.

Also in the following description, a description is given on the assumption that a portion equivalent to the moving body detection unit 431 is processed using a captured image processed by the captured image processing unit 121, but a configuration can also be adopted in which the supply of a captured image is received from a unit other than the captured image processing unit 121.

Figure 6:
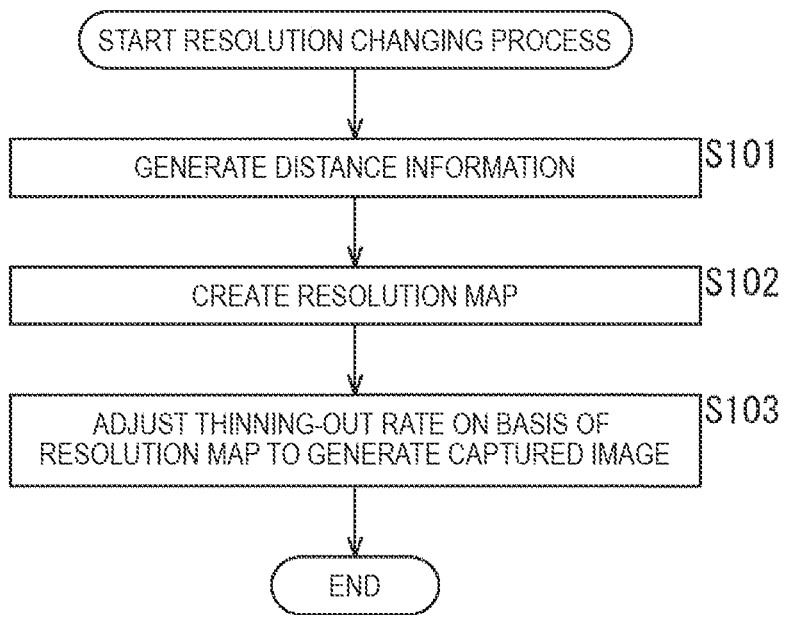
FIG. 6 is a flowchart illustrating processing of an imaging element and an image processing unit.

Processing performed by the imaging element 22D and the image processing unit 23D configured in such a manner is basically performed on the basis of the flowchart illustrated in FIG. 6, and thus a description thereof will be omitted. However, in step S101, distance information is generated, but there is a difference in that this process is replaced with a process of detecting a moving body.

Figure 10:
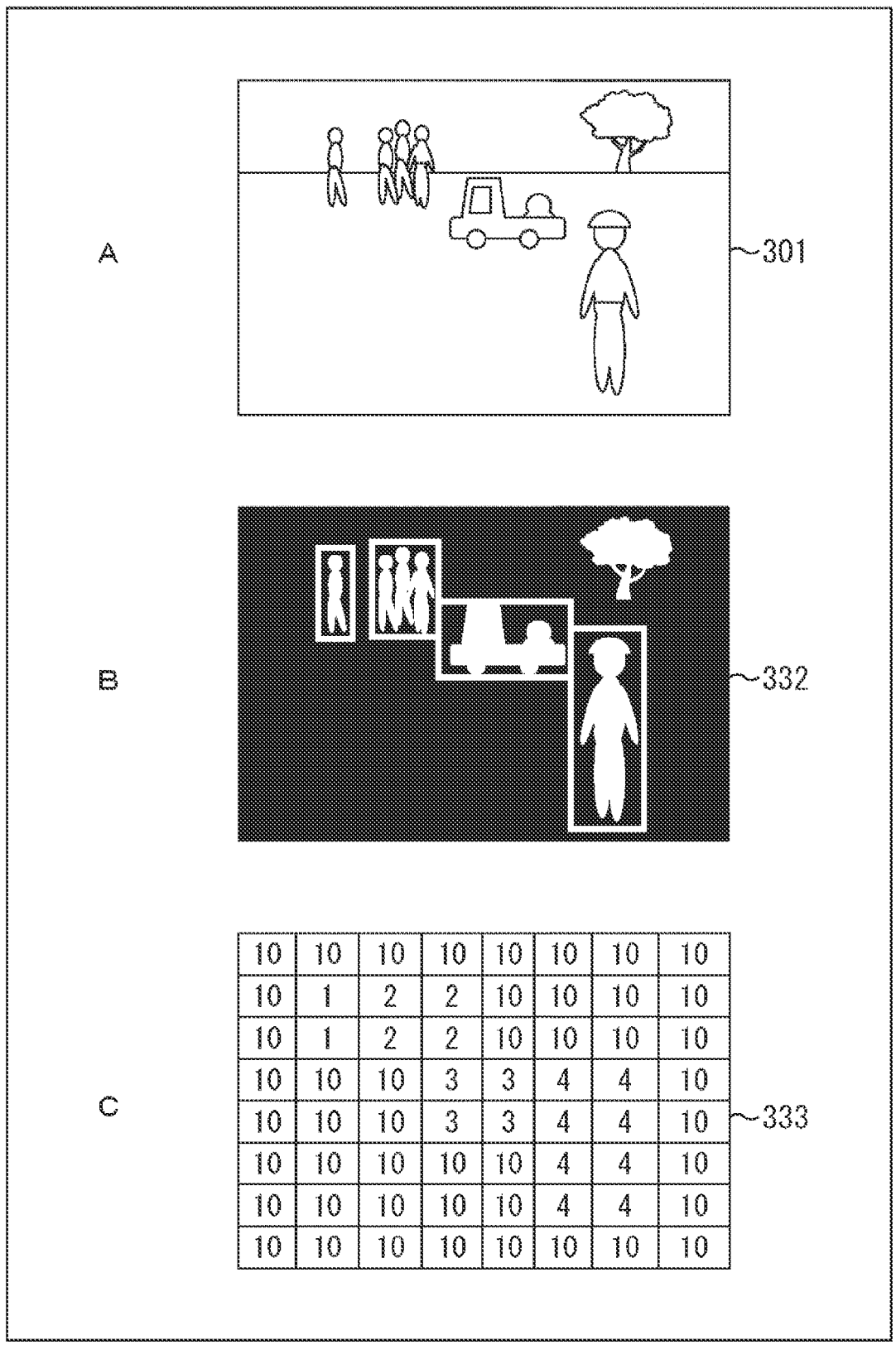
FIG. 10 is a diagram illustrating setting of a resolution corresponding to the detection of a moving body.

A description of a case in which a resolution is changed by the detection of a moving object will be added with reference to FIG. 10. A of FIG. 10 is a diagram illustrating an example of a captured image (an image to be processed). An input image 301 illustrated in A of FIG. 10 is the same as the input image 301 illustrated in A of FIG. 7.

In a case in which such an input image 301 is acquired and a moving body is detected using the input image 301, an image 332 which is a result of movement detection as illustrated in B of FIG. 10 is obtained. In B of FIG. 10, a region surrounded by a quadrangle is a region detected as a moving body.

Any method may be used as a method of detecting a moving body. For example, a moving body may be detected by comparing pixel values with each other using the input image 301 for two frames. In addition, a subject within the input image 301 and an image registered as a moving body in advance, for example, an image of a car are matched to each other, and the region of the subject may be detected as the region of the moving body in a case in which the degree of matching is high.

In a case in which a moving object detection result image 332 as illustrated in B of FIG. 10 is obtained as moving object detection information, a resolution is set for each region of the movement detection result image 332. C of FIG. 10 is a diagram illustrating an example in which a resolution is set for each region and illustrating an example of a resolution map.

A resolution map 333 illustrated in C of FIG. 10 is the same as the resolution map 303 illustrated in C of FIG. 7, and indicates that the smaller a numerical value within the resolution map 333 is, the lower a thinning-out rate is, and the higher a numerical value is, the higher a thinning-out rate is. In other words, in C of FIG. 10, the smaller a numerical value is, the higher a resolution is, and the higher a numerical value is, and the lower a resolution is.

A resolution is set to be high (maintained) for a region in which a moving body is detected, and a resolution is set to be low for the other regions. Basically, such setting is performed, but it is also possible to set a resolution in combination with a distance to a subject. C of FIG. 10 illustrates an example of the resolution map 333 in a case in which a resolution is set in consideration of such a distance.

For example, a resolution of a moving body in a distant view is set to be high, and a resolution of a moving body in a near view is set to be low. In the example illustrated in C of FIG. 10, a person detected in an upper left region as a moving body is a moving body and is far way, and thus a thinning-out rate is set to a small value such as 1 or 2. Similarly, a person detected in a lower right region is nearby, and thus a thinning-out rate is set to 4 which is a larger value than that of the person who is far away.

In addition, a high rate of 10 is set as a thinning-out rate for a region in which a moving body is not detected. For example, in a case in which thinning-out rates of 10 levels of 1 to 10 are set, it is possible to prevent pixel values from being read out from the region when a thinning-out rate is 10.

In a case in which it is intended to detect a moving body and perform any processing on the moving body, a thinning-out rate is set to 10 for a portion other than the moving body so as to prevent the portion from being read out. In this manner, it is possible to drastically reduce the amount of data to be processed.

In this manner, it is also possible to detect a moving body and to set a resolution in accordance with the detected moving body. In addition, it is also possible to set a resolution in accordance with a result of movement detection and a distance to the moving body.

Note that, in a case in which a resolution is set using not only a result of movement detection but also a distance, a configuration can be adopted in which the above-described processing is executed by adding the distance information acquisition unit 131 and the distance information generation unit 109 to the configuration illustrated in FIG. 9.

<Change of Resolution Based on Detection of Person>

Next, a case in which a person is detected and a resolution is changed on the basis of (the region of) the detected person will be described as an example of a case in which a resolution is changed on the basis of information other than a distance.

Figure 11:
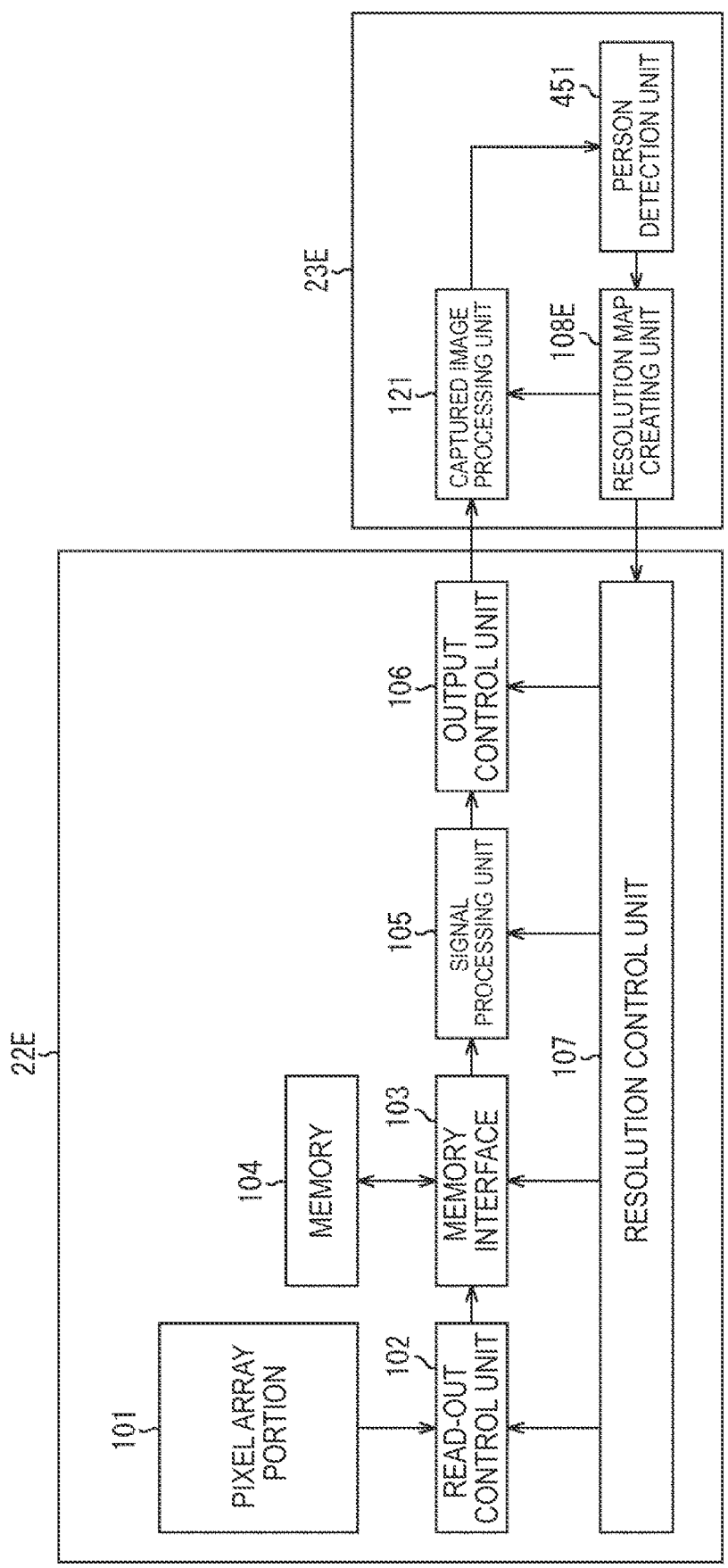
FIG. 11 is a diagram illustrating another configuration example of each of an imaging element and an image processing unit.

FIG. 11 is a diagram illustrating configuration examples of an imaging element 22E and an image processing unit 23E when adopting a configuration in which a resolution is changed on the basis of the detection of a person. In a configuration of each of the imaging element 22E and the image processing unit 23E illustrated in FIG. 11 and a configuration of each of the imaging element 22B and the image processing unit 23B illustrated in FIG. 3, the same components are denoted by the same reference numerals and signs, and a description thereof will be appropriately omitted.

The imaging element 22E illustrated in FIG. 11 has the same configuration as that of the imaging element 22B illustrated in FIG. 3. The image processing unit 23E illustrated in FIG. 11 is different from the image processing unit 23B illustrated in FIG. 3 in that the distance information generation unit 109 of the image processing unit 23B is replaced with a person detection unit 451.

The person detection unit 451 of the image processing unit 23E illustrated in FIG. 11 detects a person using a captured image processed by the captured image processing unit 121. A resolution map creating unit 108E creates a resolution map on the basis of (the region of) the person detected by the person detection unit 451.

Processing performed by the imaging element 22E and the image processing unit 23E configured in such a manner is basically performed on the basis of the flowchart illustrated in FIG. 6, and thus a description thereof will be omitted. However, in step S101, distance information is generated, but there is a difference in that this process is replaced with a process of detecting a person.

A description of a case in which a resolution is changed by the detection of a person will be added with reference to FIG. 12. A of FIG. 12 is a diagram illustrating an example of a captured image (an image to be processed). An input image 301 illustrated in A of FIG. 12 is the same as the input image 301 illustrated in A of FIG. 7.

In a case in which such an input image 301 is acquired and a person is detected using the input image 301, an image 352 which is a result of person detection as illustrated in B of FIG. 12 is obtained. In B of FIG. 12, a region surrounded by a quadrangle is a region detected as a person.

Any method may be used as a method of detecting a person. A subject within the input image 301 and an image registered as a person in advance are matched to each other, and the region of the subject may be detected as the region of the person in a case in which the degree of matching is high.

In a case in which a person detection result image 352 as illustrated in B of FIG. 12 is obtained as person detection information, a resolution is set for each region of the person detection result image 352. C of FIG. 12 is a diagram illustrating an example in which a resolution is set for each region and illustrating an example of a resolution map.

A resolution map 353 illustrated in C of FIG. 12 is the same as the resolution map 303 illustrated in C of FIG. 7, and indicates that the smaller a numerical value within the resolution map 353 is, the lower a thinning-out rate is, and the higher a numerical value is, the higher a thinning-out rate is. In other words, in C of FIG. 12, the smaller a numerical value is, the higher a resolution is, and the higher a numerical value is, and the lower a resolution is.

A resolution is set to be high (maintained) for a region in which a person is detected, and a resolution is set to be low for the other regions. Basically, such setting is performed, but it is also possible to set a resolution in combination with a distance to a subject. C of FIG. 12 illustrates the resolution map 353 in a case in which a resolution is set in consideration of such a distance.

For example, a resolution of a person in a distant view is set to be high, and a resolution of a person in a near view is set to be low. In the example illustrated in C of FIG. 12, a person detected in an upper left region as a person is a person and is far way, and thus a thinning-out rate is set to a small value such as 1 or 2. Similarly, a person detected in a lower right region is nearby, and thus a thinning-out rate is set to 4 which is a larger value than that of the person who is in a distant view.

In addition, a high rate of 10 is set as a thinning-out rate for a region in which a person is not detected. For example, in a case in which thinning-out rates of 10 levels of 1 to 10 are set, it is possible to prevent pixel values from being read out from the region when a thinning-out rate is 10.

In a case in which it is intended to detect a person and perform any processing on the person, a thinning-out rate is set to 10 for a portion other than the person so as to prevent the portion from being read out. In this manner, it is possible to drastically reduce the amount of data to be processed.

In this manner, it is also possible to detect a person and to set a resolution in accordance with the detected person. In addition, it is also possible to set a resolution in accordance with a result of person detection and a distance to the person.

Note that, in a case in which a resolution is set using not only a result of person detection but also a distance, a configuration can be adopted in which the above-described processing is executed by adding the distance information acquisition unit 131 and the distance information generation unit 109 to the configuration illustrated in FIG. 11.

Note that, here, although a case of detection of a person has been described as an example, it is also possible to detect a portion of the person, such as the face, hand, or foot of the person, and change a resolution of the portion. In addition, it is also possible to detect a portion of a person and change a resolution in accordance with a distance of the portion.

In addition, for example, a configuration may be adopted in which in a case in which a person's face is detected and the degree of matching between the person's face and a face satisfying a predetermined condition, for example, a face registered in advance is high, a resolution of the region of the face is set to be high, and on the contrary, when a face which is highly unlikely to be a face registered in advance is detected, a resolution of the region of the face is set to be high.

<Change of Resolution Based on Detection of Size>

Next, a case in which the size of a subject is detected and a resolution is changed on the basis of the detected size will be described as an example of a case in which a resolution is changed on the basis of information other than a distance.

Figure 13:
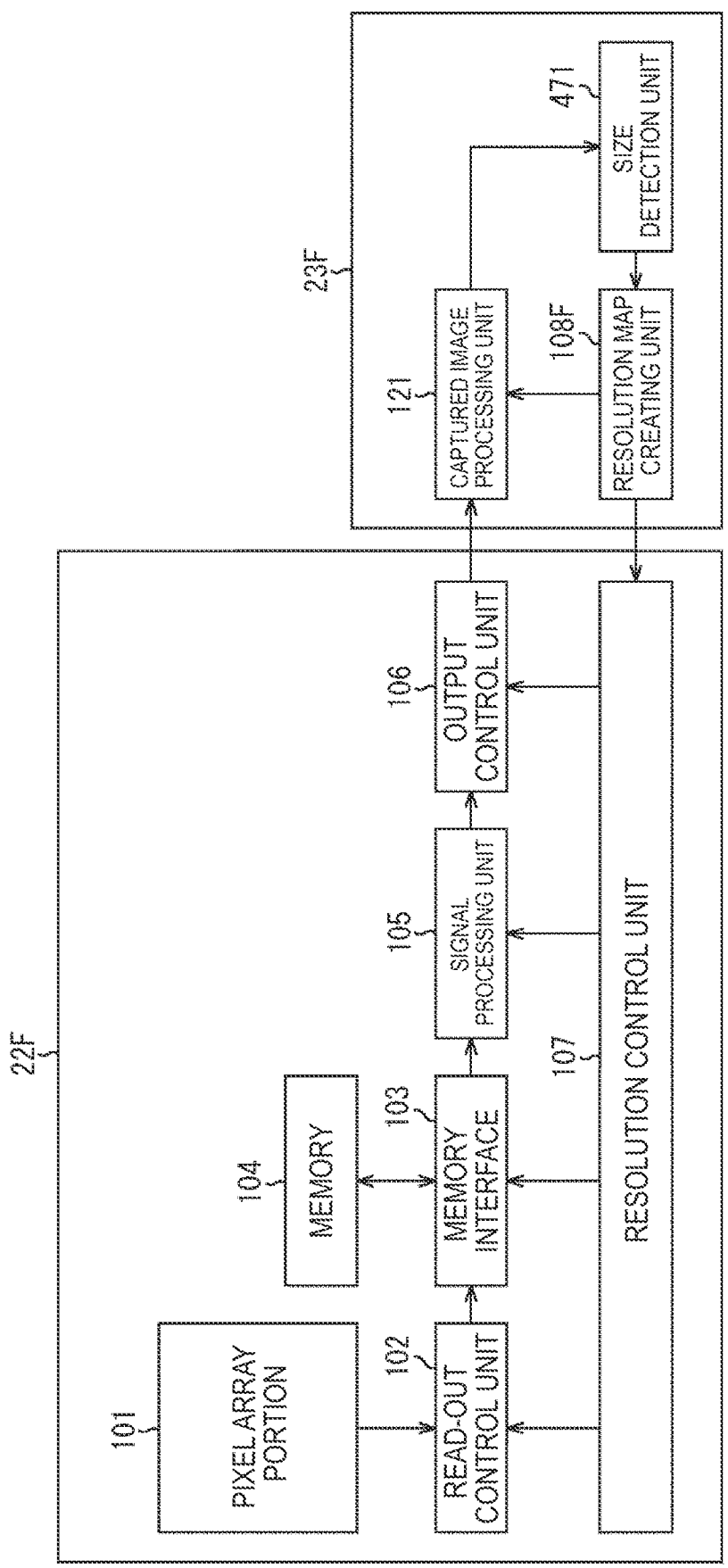
FIG. 13 is a diagram illustrating another configuration example of each of an imaging element and an image processing unit.

FIG. 13 is a diagram illustrating configuration examples of an imaging element 22I and an image processing unit 23I when adopting a configuration in which a resolution is changed on the basis of detection of the size. In a configuration of each of the imaging element 22F and the image processing unit 23F illustrated in FIG. 13 and a configuration of each of the imaging element 22B and the image processing unit 23B illustrated in FIG. 3, the same components are denoted by the same reference numerals and signs, and a description thereof will be appropriately omitted.

The imaging element 22F illustrated in FIG. 13 has the same configuration as that of the imaging element 22B illustrated in FIG. 3. The image processing unit 23F illustrated in FIG. 13 is different from the image processing unit 23B illustrated in FIG. 3 in that the distance information generation unit 109 of the image processing unit 23B is replaced with a size detection unit 471.

The size detection unit 471 of the image processing unit 23F illustrated in FIG. 13 detects a subject imaged within a captured image processed by the captured image processing unit 121 using the captured image, and detects the size of the subject. A resolution map creating unit 108F creates a resolution map on the basis of the size of the subject detected by the size detection unit 471.

Processing performed by the imaging element 22F and the image processing unit 23F configured in such a manner is basically performed on the basis of the flowchart illustrated in FIG. 6, and thus a description thereof will be omitted. However, in step S101, distance information is generated, but there is a difference in that this process is replaced with a process of detecting the size of a subject.

A description of a case in which a resolution is changed by the detection of a size will be added again with reference to FIG. 10. A of FIG. 10 is a diagram illustrating an example of a captured image (an image to be processed). An input image 301 illustrated in A of FIG. 10 is the same as the input image 301 illustrated in A of FIG. 7.

In a case in which such an input image 301 is acquired, a subject is detected using the input image 301, and the size of the subject is detected, an image 352 which is a result of size detection as illustrated in B of FIG. 10 is obtained. In B of FIG. 10, a region surrounded by a quadrangle is a region in which a subject (object) is detected and is a region which is set as the size.

Any method may be used as a method of detecting a size. It is possible to detect a size by detecting a subject within an input image 301 and detecting the region of the subject as a size, and any method may be used for the detection of the subject in such a case.

In a case in which a size detection result image 352 as illustrated in B of FIG. 10 is obtained as size detection information, a resolution is set for each region of the size detection result image 352. C of FIG. 10 is a diagram illustrating an example in which a resolution is set for each region and illustrating an example of a resolution map.

A resolution map 353 illustrated in C of FIG. 10 is the same as the resolution map 303 illustrated in C of FIG. 7, and indicates that the smaller a numerical value within the resolution map 353 is, the lower a thinning-out rate is, and the higher a numerical value is, the higher a thinning-out rate is. In other words, in C of FIG. 10, the smaller a numerical value is, the higher a resolution is, and the higher a numerical value is, and the lower a resolution is.

It is possible to set a higher thinning-out rate (a lower resolution) as a detected size in a region in which a size is detected becomes larger. This is because it is considered that there is a strong likelihood that, in a case of a large size, a desired amount of information is obtained even when a resolution is lowered.

Basically, such setting is performed, but it is also possible to set a resolution in combination with a distance to a subject. C of FIG. 10 illustrates the resolution map 353 in a case in which a resolution is set in consideration of such a distance.

For example, a resolution of a small subject in a distant view is set to be high (maintained), and a resolution of a large subject in a near view is set to be low. In the example illustrated in C of FIG. 10, as a size, a person detected in an upper left region has a small size and is far away, and thus a thinning-out rate is set to a small value of 1 or 2. In addition, a person detected in a lower right region has a large size and is nearby, and thus a thinning-out rate is set to 4.

In this manner, in a case in which a resolution of a small subject in a distant view is set to be high and a resolution of a large subject in a near view is set to be low, it is possible to reduce the amount of data in a portion in a near view and to continuously detect a small subject in a distant view without losing sight of the subject.

In addition, a resolution of a large subject in a distant view may be set to be low. Even in a distant view, the large subject is highly likely to be detected even when a resolution is lowered, and thus it is also possible to lower a resolution and to reduce the amount of data.

In addition, a resolution of a small subject in a near view may be set to be high. Even in a near view, the small subject is highly unlikely to be detected when a resolution is lowered, and thus it is also possible to set a resolution to a higher value and to detect such a small subject without losing sight of the subject.

In this manner, a resolution is set in accordance with an object which is a subject and a distance, and thus it is possible to realize the acquisition of efficient imaging data even when a large object is in the distance and a small object is in a near view.

Such setting can be performed, but it is also possible to set a resolution in accordance with sizes of subjects positioned at the same distance (a distance within a predetermined range). For example, a resolution of a large subject is set to be low and a resolution of a small subject is set to be high among a plurality of subjects present at the same distance.

In spite of the same distance, there is a strong likelihood that desired information may be obtained from a large subject even when a resolution is lowered, and thus a resolution is lowered. On the other hand, in spite of the same distance, there is a strong likelihood that desired information may not be obtained from a small subject when a resolution is lowered, and thus a resolution is maintained or increased without being lowered.

Also in a case in which a resolution is set in accordance with the size of a subject and a distance in this manner, it is possible to realize the acquisition of efficient imaging data even when a large object is present in the distance and a small object is present in a near view and when both a large object and a small object are present in the same distance.

A high rate of 10 may be set as a thinning-out rate for a region in which a size (subject) is not detected. For example, in a case in which thinning-out rates of 10 levels of 1 to 10 are set, it is possible to prevent pixel values from being read out from the region when the thinning-out rate is 10. In this manner, it is possible to drastically reduce the amount of data to be processed.

In this manner, it is also possible to detect a size and to set a resolution in accordance with the detected size. In addition, it is also possible to set a resolution in accordance with a result of size detection and a distance to a subject of which the size is detected.

Note that, in a case in which a resolution is set using not only a result of size detection but also a distance, a configuration can be adopted in which the above-described processing is executed by adding the distance information acquisition unit 131 and the distance information generation unit 109 to the configuration illustrated in FIG. 13.

<Change of Resolution Based on Detection of Texture>

Next, a case in which texture or the amount of edge (hereinafter, a description will be given using texture as an example) is detected and a resolution is changed on the basis of the detected texture will be described as an example of a case in which a resolution is changed on the basis of information other than a distance.

Figure 14:
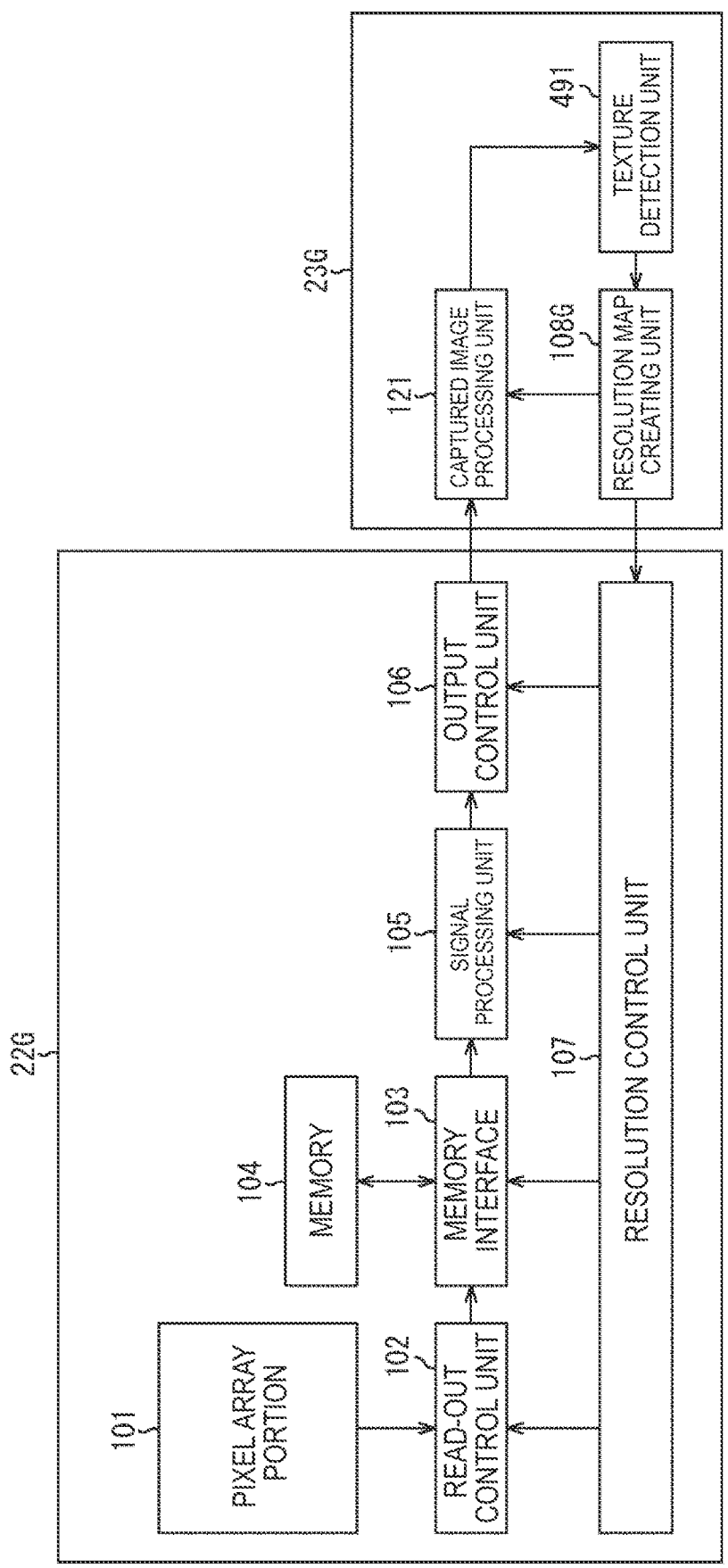
FIG. 14 is a diagram illustrating another configuration example of each of an imaging element and an image processing unit.

FIG. 14 is a diagram illustrating configuration examples of an imaging element 22G and an image processing unit 23G when adopting a configuration in which a resolution is changed on the basis of detection of the texture. In a configuration of each of the imaging element 22G and the image processing unit 23G illustrated in FIG. 14 and a configuration of each of the imaging element 22B and the image processing unit 23B illustrated in FIG. 3, the same components are denoted by the same reference numerals and signs, and a description thereof will be appropriately omitted.

The imaging element 22G illustrated in FIG. 14 has the same configuration as that of the imaging element 22B illustrated in FIG. 3. The image processing unit 23G illustrated in FIG. 14 is different from the image processing unit 23B illustrated in FIG. 3 in that the distance information generation unit 109 of the image processing unit 23B is replaced with a texture detection unit 491.

The texture detection unit 491 of the image processing unit 23G illustrated in FIG. 14 detects texture using a captured image processed by the captured image processing unit 121. A resolution map creating unit 108G creates a resolution map on the basis of the texture detected by the texture detection unit 491.

Processing performed by the imaging element 22G and the image processing unit 23G configured in such a manner is basically performed on the basis of the flowchart illustrated in FIG. 6, and thus a description thereof will be omitted. However, in step S101, distance information is generated, but there is a difference in that this process is replaced with a process of detecting texture.

Any method may be used as a method of detecting texture. It is possible to detect an edge (for example, a boundary between an object and a background) within an input image 301 and to detect texture from the amount of edge. It is possible to detect, for example, a region other than the object by detecting the texture.

As texture, for example, it is considered that there is no much change in the amount of information in flat texture (texture of which the color does not much change, or the like) between a case in which a resolution is set to be high and a case in which a resolution is set to be low. Accordingly, a low resolution (a high thinning-out rate) is set for a region in which flat texture (a small amount of edge) is detected.

In addition, as texture, for example, a high resolution (a low thinning-out rate) is set for a region in which texture (a large amount of edge) not being flat texture is detected, and is set to be a resolution with which texture can be reproduced as faithful as possible.

In this manner, it is possible to set a thinning-out rate in accordance with the amount of edge.

In addition, it is also possible to set different resolution in a region in which texture is detected and a region in which texture is not detected. For example, a low resolution is set for the region in which texture is detected, and a high resolution is set for the region in which texture is not detected.

Basically, such setting is performed, but it is also possible to set a resolution in combination with a distance to a subject. For example, it is also possible to set a resolution in accordance with a distance to a subject and to set a resolution in accordance with the detection of texture.

A resolution of a subject in a distant view is set to be high and a resolution of a subject in a near view is set to be low, for example, like the above-described change of a resolution based on a distance. A resolution is set in this manner, and thus it is possible to detect a subject in a distant view without losing sight of the subject and to reduce the amount of data in a near view.

Further, even in a distant region, it is not necessary to acquire an image by increasing a resolution for a region determined to have texture or a small amount of edge, for example, a region such as sky, a road surface, or a flat wall, and thus a resolution is set to be low.

In this manner, it is possible to reduce the amount of data by lowering a resolution in accordance with texture or the amount of edge even in a distant region.

Note that, in a case in which a region of texture is detected and any processing is performed on the detected texture, a resolution in the region in which texture is detected can also be set to be higher than resolutions in other regions in which texture is not detected.

In this manner, it is also possible to detect texture and to set a resolution in accordance with the detected texture. In addition, a resolution can also be set in accordance with a result of texture detection and a distance to the texture.

Note that, in a case in which a resolution is set using not only a result of texture detection but also a distance, a configuration can be adopted in which the above-described processing is executed by adding the distance information acquisition unit 131 and the distance information generation unit 109 to the configuration illustrated in FIG. 14.

<Change of Resolution Based on Detection of Type>

Next, a case in which a type of subject is detected and a resolution is changed on the basis of the detected type will be described as an example of a case in which a resolution is changed on the basis of information other than a distance. The type of subject is a material of an object such as cloth or a metal. In addition, the type of subject also includes types such as a person and a car.

Figure 15:
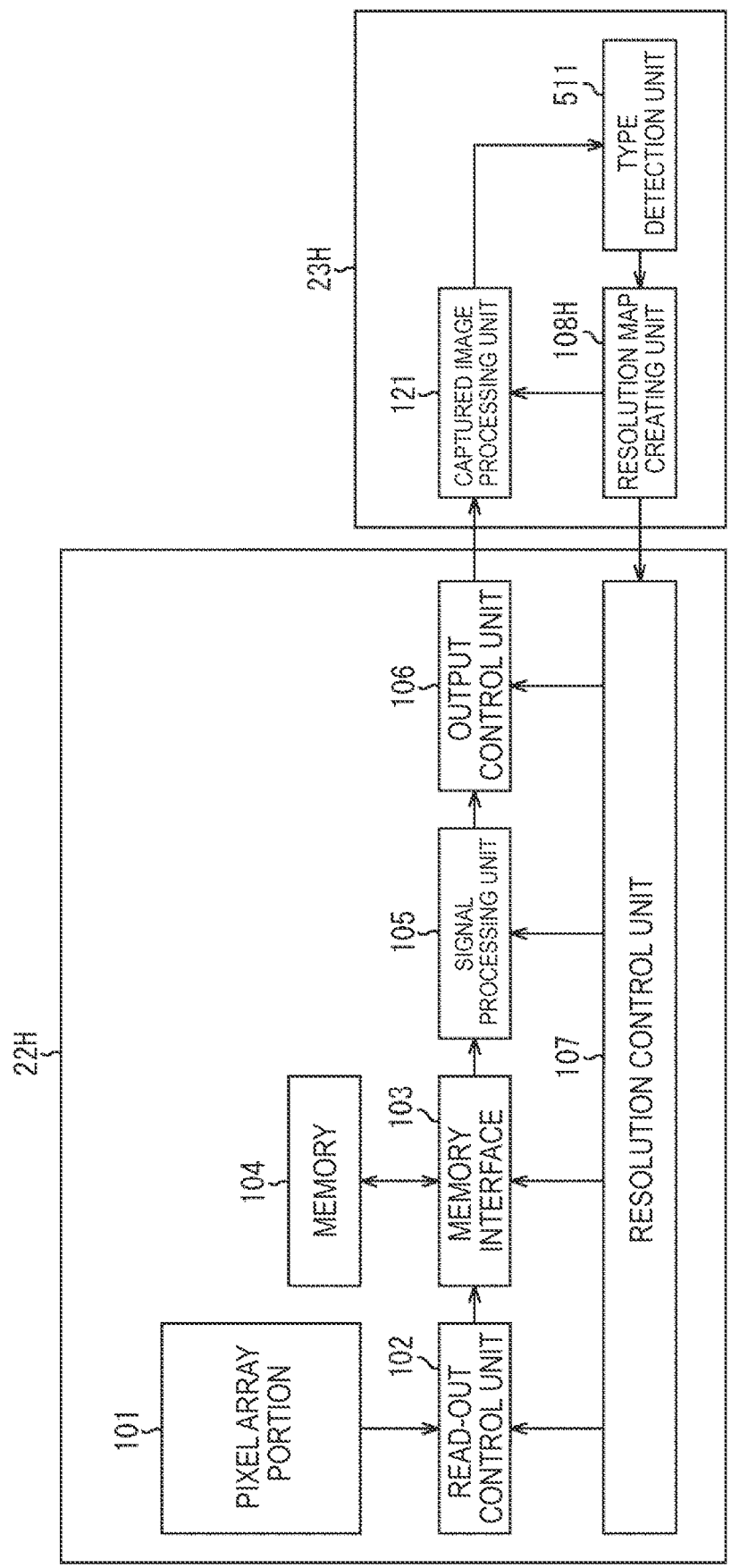
FIG. 15 is a diagram illustrating another configuration example of each of an imaging element and an image processing unit.

FIG. 15 is a diagram illustrating configuration examples of an imaging element 22H and an image processing unit 23H when adopting a configuration in which a resolution is changed on the basis of detection of a type. In a configuration of each of the imaging element 22H and the image processing unit 23H illustrated in FIG. 15 and a configuration of each of the imaging element 22B and the image processing unit 23B illustrated in FIG. 3, the same components are denoted by the same reference numerals and signs, and a description thereof will be appropriately omitted.

The imaging element 22H illustrated in FIG. 15 has the same configuration as that of the imaging element 22B illustrated in FIG. 3. The image processing unit 23H illustrated in FIG. 15 is different from the image processing unit 23B illustrated in FIG. 3 in that the distance information generation unit 109 of the image processing unit 23B is replaced with a type detection unit 511.

The type detection unit 511 of the image processing unit 23H illustrated in FIG. 15 detects a subject using a captured image processed by the captured image processing unit 121 and detects the type of subject. A resolution map creating unit 108H creates a resolution map on the basis of a type detected by the type detection unit 511.

Processing performed by the imaging element 22H and the image processing unit 23H configured in such a manner is basically performed on the basis of the flowchart illustrated in FIG. 6, and thus a description thereof will be omitted. However, in step S101, distance information is generated, but there is a difference in that this process is replaced with a process of detecting the type of a subject.

As a method of detecting a type, any method may be used, or a general recognition technique or the like can be used. For example, a person detection technique, a car detection technique, or the like can be used, and a method based on a technique such as machine learning or Deep Learning can be used. In addition, gloss, a pattern, and the like are different depending on a material, and such features are extracted, so that a type may be detected.

In a case in which a material such as a metal or wood, a face, a license plate, or the like is detected as a type and such a type is detected, a resolution can be set in accordance with the detected type. For example, in a case in which a license plate or the like is detected, a resolution is set to be high so that characters can be read clearly.

Basically, setting is performed in accordance with such a type, but it is also possible to set a resolution in combination with a distance to a subject. For example, it is also possible to set a resolution in accordance with a distance to a subject and to set a resolution in accordance with detection of a type.

A resolution of a subject in a distant view is set to be high and a resolution of a subject in a near view is set to be low, for example, like the above-described change of a resolution based on a distance. A resolution is set in this manner, and thus it is possible to detect a subject in a distant view without losing sight of the subject and to reduce the amount of data in a near view.

Further, even in a near view, a resolution is set to be high, for example, for a region classified as a type such as a license plate or a face in accordance with a type.

In this manner, a resolution is increased in accordance with a type even in a near view, and thus it is possible to further improve the accuracy of detection of a predetermined object.

In this manner, usually, the detection of a small object in the distance is also robust, and it is possible to set a resolution to be high so as to further obtain detailed data for a region having a type of object desired to be noticed while reducing the amount of data by thinning out a near view, whereby it is possible to realize the acquisition of efficient imaging data.

Note that, in a case in which a resolution is set using not only a result of type detection but also a distance, a configuration can be adopted in which the above-described processing is executed by adding the distance information acquisition unit 131 and the distance information generation unit 109 to the configuration illustrated in FIG. 15.

<Change of Resolution Based on Detection of Amount of Movement>

Next, a case in which the amount of movement of a subject is detected and a resolution is changed on the basis of the detected amount of movement will be described as an example of a case in which a resolution is changed on the basis of information other than a distance.

Figure 16:
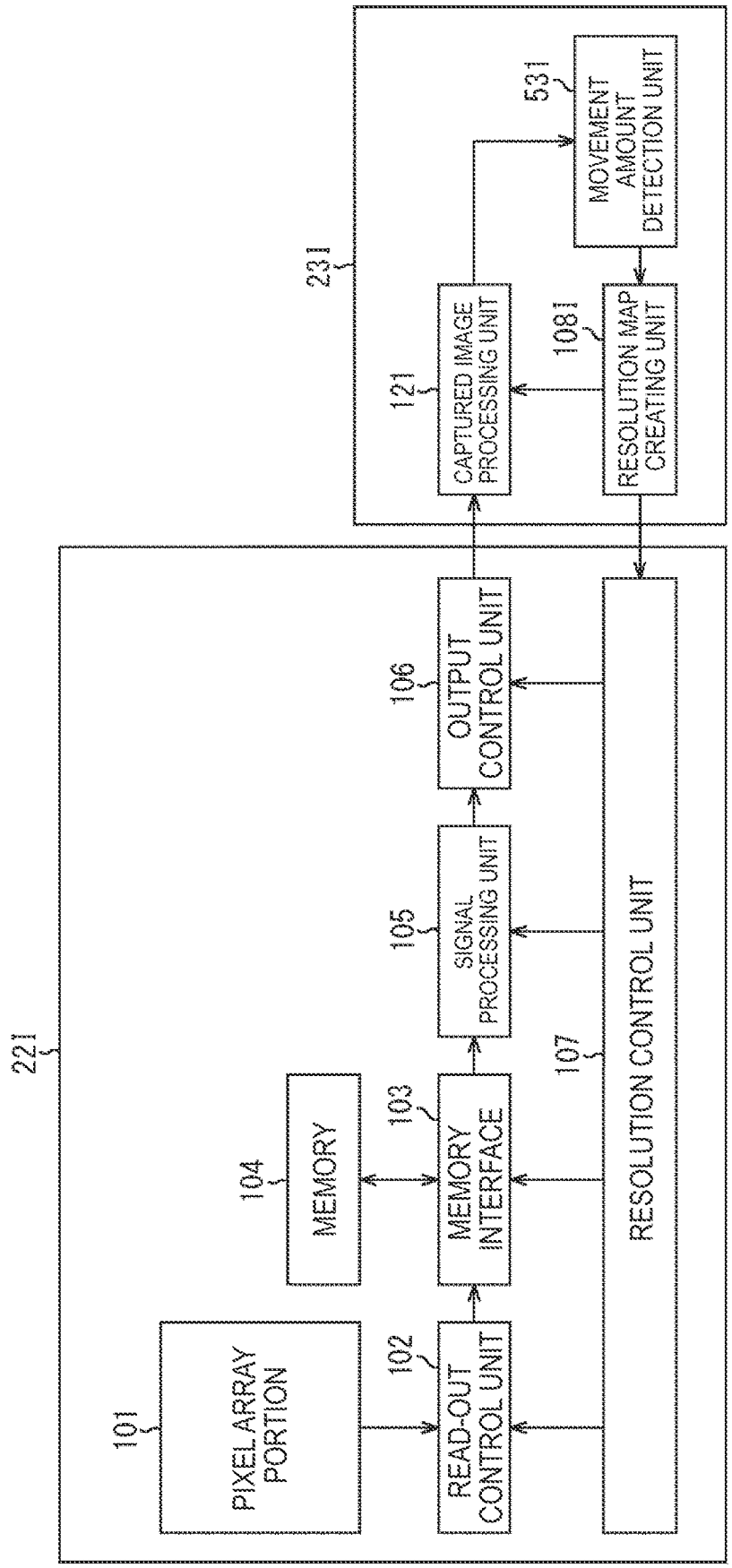
FIG. 16 is a diagram illustrating another configuration example of each of an imaging element and an image processing unit.

FIG. 16 is a diagram illustrating configuration examples of an imaging element 22I and an image processing unit 23I when adopting a configuration in which a resolution is changed on the basis of detection of the amount of movement. In a configuration of each of the imaging element 22I and the image processing unit 23I illustrated in FIG. 16 and a configuration of each of the imaging element 22B and the image processing unit 23B illustrated in FIG. 3, the same components are denoted by the same reference numerals and signs, and a description thereof will be appropriately omitted.

The imaging element 22I illustrated in FIG. 16 has the same configuration as that of the imaging element 22B illustrated in FIG. 3. The image processing unit 23I illustrated in FIG. 16 is different from the image processing unit 23B illustrated in FIG. 3 in that the distance information generation unit 109 of the image processing unit 23B is replaced with a movement amount detection unit 531.

The movement amount detection unit 531 of the image processing unit 23I illustrated in FIG. 16 detects a subject using a captured image processed by the captured image processing unit 121 and detects the amount of movement of the subject. A resolution map creating unit 108I creates a resolution map on the basis of the amount of movement detected by the movement amount detection unit 531.

Processing performed by the imaging element 22I and the image processing unit 23I configured in such a manner is basically performed on the basis of the flowchart illustrated in FIG. 6, and thus a description thereof will be omitted. However, in step S101, distance information is generated, but there is a difference in that this process is replaced with a process of detecting the amount of movement of a subject.

Any method may be used as a method of detecting the amount of movement. For example, a moving body may be detected by comparing pixel values with each other using the input image 301 for two frames, and the amount of movement of the moving body may further be detected.

A resolution in a region having a subject (moving body) is set to be low in a case in which the amount of movement of the subject is large, and a resolution in a region having a subject (moving body) is set to be high in a case in which the amount of movement of the subject is small. For example, in a case in which a region of a moving body having a small amount of movement and moving across only several pixels in units of pixels is thinned out, there is a likelihood that an object cannot be detected with a high level of accuracy (the amount of movement of the object cannot be detected with a high level of accuracy), and thus it is possible to set a resolution to be high for an object having a small amount of movement.

Basically, setting is performed in accordance with such an amount of movement, but it is also possible to set a resolution in combination with a distance to a subject. For example, it is also possible to set a resolution in accordance with a distance to a subject and to set a resolution in accordance with detection of an amount of movement.

A resolution of a subject in a distant view is set to be high and a resolution of a subject in a near view is set to be low, for example, like the above-described change of a resolution based on a distance. A resolution is set in this manner, and thus it is possible to detect a subject in a distant view without losing sight of the subject and to reduce the amount of data in a near view.

Further, even in a near view, a resolution is set to be high, for example, for a region having an object moving with a different amount of movement from that of a surrounding object in accordance with the amount of movement. For example, a speeding car is traveling at a speed different from those of surrounding cars traveling at speeds which are not speeding. It is possible to detect such a car traveling at a speed different from those of surrounding cars and to set a high resolution in a region in which the car is imaged so as to follow the car.

In addition, for example, in a case in which there is a person who is moving at a speed different from those of other persons in a crowd, in other words, there is a person who is running away, it is possible to detect such a person who is moving at a speed different from those of the surrounding persons and to set a high resolution in a region in which the person is imaged so as to follow the person.

In this manner, it is possible to further improve the accuracy of detection of a predetermined object by increasing a resolution even in a near view, in accordance with the amount of movement.

In this manner, usually, the detection of a small object in the distance is also robust, and it is possible to set a resolution to be high so as to further obtain detailed data for the region in a case in which an abnormality occurs while reducing the amount of data by thinning out a near view, and to realize the acquisition of efficient imaging data.

Note that, in a case in which a resolution is set using not only a result of movement amount detection but also a distance, a configuration can be adopted in which the above-described processing is executed by adding the distance information acquisition unit 131 and the distance information generation unit 109 to the configuration illustrated in FIG. 16.

<Change of Resolution Based on Detection of Moving Direction>

Next, a case in which a moving direction of a subject is detected and a resolution is changed on the basis of the detected moving direction will be described as an example of a case in which a resolution is changed on the basis of information other than a distance.

Figure 17:
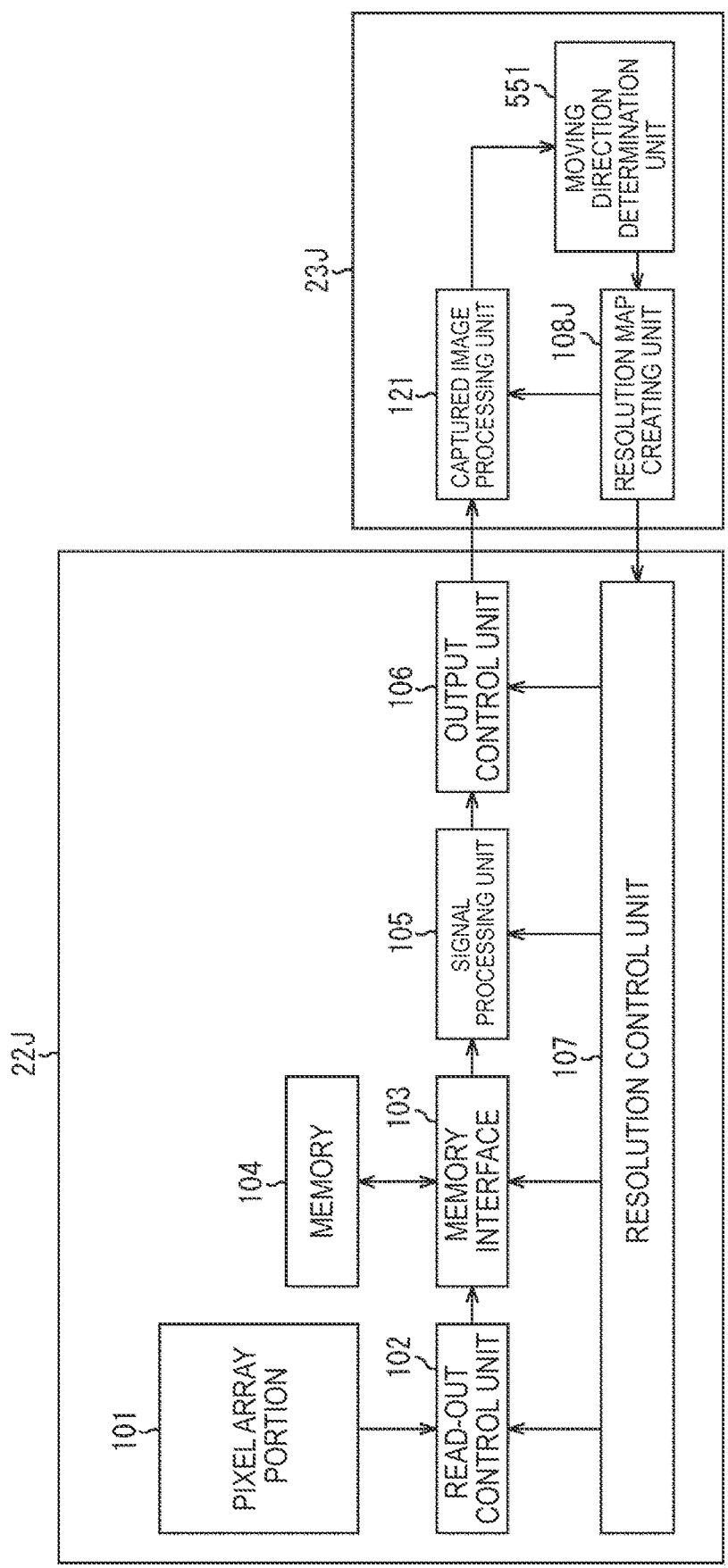
FIG. 17 is a diagram illustrating another configuration example of each of an imaging element and an image processing unit.

FIG. 17 is a diagram illustrating configuration examples of an imaging element 22J and an image processing unit 23J when adopting a configuration in which a resolution is changed on the basis of detection of the moving direction. In a configuration of each of the imaging element 22J and the image processing unit 23J illustrated in FIG. 17 and a configuration of each of the imaging element 22B and the image processing unit 23B illustrated in FIG. 3, the same components are denoted by the same reference numerals and signs, and a description thereof will be appropriately omitted.

The imaging element 22J illustrated in FIG. 17 has the same configuration as that of the imaging element 22B illustrated in FIG. 3. The image processing unit 23J illustrated in FIG. 17 is different from the image processing unit 23B illustrated in FIG. 3 in that the distance information generation unit 109 of the image processing unit 23B is replaced with a moving direction detection unit 551.

The moving direction detection unit 551 of the image processing unit 23J illustrated in FIG. 17 detects a subject using a captured image processed by the captured image processing unit 121 and detects the moving direction of the subject. A resolution map creating unit 108J creates a resolution map on the basis of the moving direction detected by the moving direction detection unit 551.

Processing performed by the imaging element 22J and the image processing unit 23J configured in such a manner is basically performed on the basis of the flowchart illustrated in FIG. 6, and thus a description thereof will be omitted. However, in step S101, distance information is generated, but there is a difference in that this process is replaced with a process of detecting the moving direction of a subject.

Any method may be used as a method of detecting the moving direction. For example, a moving body may be detected by comparing pixel values with each other using the input image 301 for two frames, and the moving direction of the moving body may further be detected.

In a case in which there is a subject having a moving direction different from those of other subject, a resolution in a region having the subject (moving body) is set to be high. For example, in a case in which the imaging device 10 (FIG. 1) is used for the purpose of a surveillance camera and a predetermined place, for example, a ticket gate or a one-way road is imaged, a person or a car basically moves in the same direction in such a place.

There is a strong likelihood that a person or a car moving in a different direction is a suspicious object in such a place. Accordingly, in a case in which such an object moving in a direction different from those of other objects is detected, a resolution in a region of the object is set to be high.

Basically, setting is performed in accordance with such a moving direction, but it is also possible to set a resolution in combination with a distance to a subject. For example, it is also possible to set a resolution in accordance with a distance to a subject and to set a resolution in accordance with detection of a moving direction.

A resolution of a subject in a distant view is set to be high and a resolution of a subject in a near view is set to be low, for example, like the above-described change of a resolution based on a distance. A resolution is set in this manner, and thus it is possible to detect a subject in a distant view without losing sight of the subject and to reduce the amount of data in a near view.

Further, even in a near view, a resolution is set to be high, for example, for a region having an object moving in a moving direction different from those of the surrounding objects, in accordance with a moving direction.

In this manner, it is possible to further improve the accuracy of detection of a predetermined object by increasing a resolution even in a near view, in accordance with the moving direction.

In this manner, usually, the detection of a small object in the distance is also robust, and it is possible to set a resolution to be high so as to further obtain detailed data for the region in a case in which an abnormality occurs while reducing the amount of data by thinning out a near view, and to realize the acquisition of efficient imaging data.

Note that, in a case in which a resolution is set using not only a result of moving direction detection but also a distance, a configuration can be adopted in which the above-described processing is executed by adding the distance information acquisition unit 131 and the distance information generation unit 109 to the configuration illustrated in FIG. 17.

<Change of Resolution Based on Detection of Load>

Next, a case in which a load of a network or a processing unit is detected and a resolution is changed on the basis of the detected load will be described as an example of a case in which a resolution is changed on the basis of information other than a distance.

Figure 18:
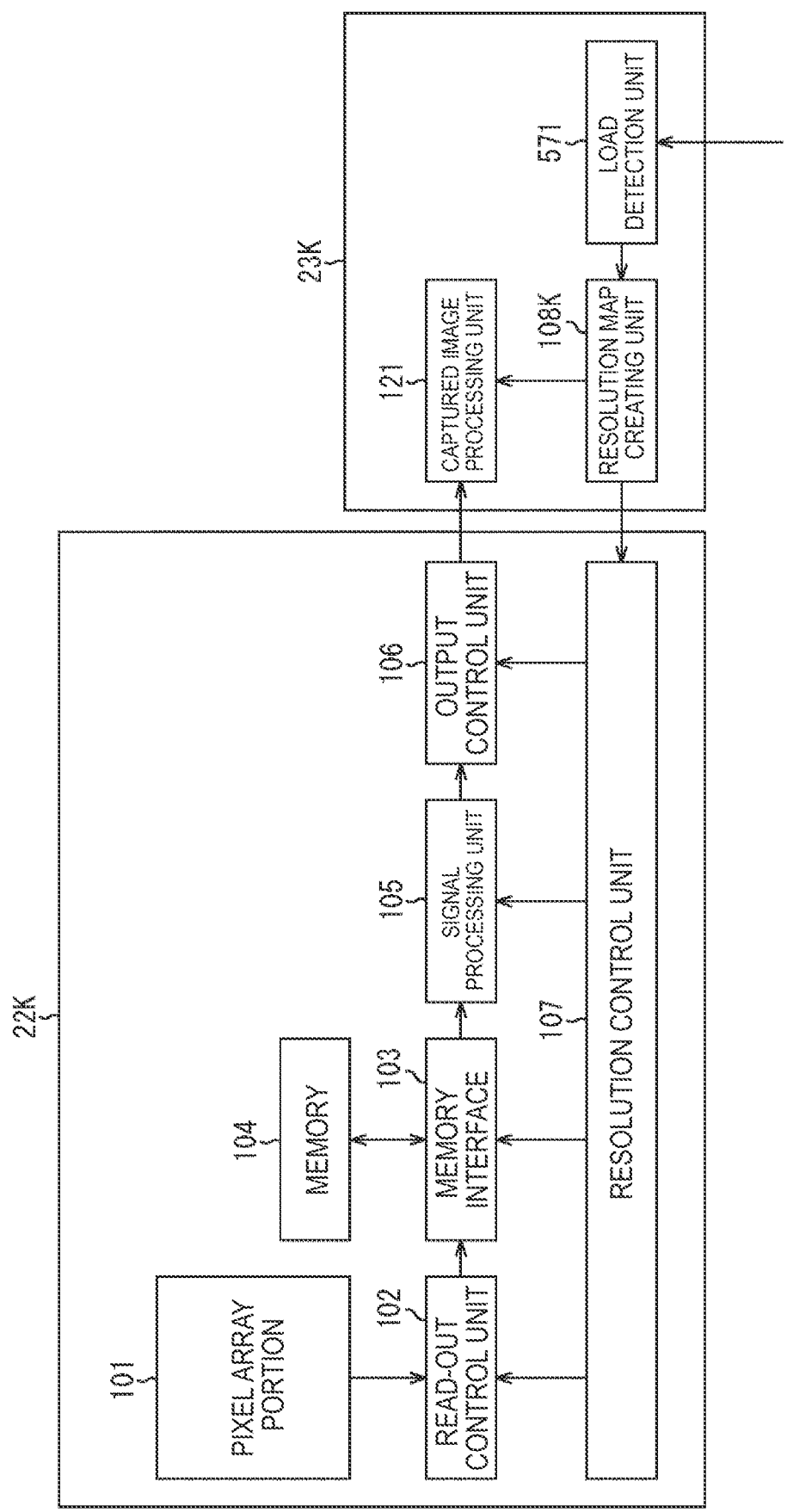
FIG. 18 is a diagram illustrating another configuration example of each of an imaging element and an image processing unit.

FIG. 18 is a diagram illustrating configuration examples of an imaging element 22K and an image processing unit 23K when adopting a configuration in which a resolution is changed on the basis of detection of a load. In a configuration of each of the imaging element 22K and the image processing unit 23H illustrated in FIG. 18 and a configuration of each of the imaging element 22B and the image processing unit 23B illustrated in FIG. 3, the same components are denoted by the same reference numerals and signs, and a description thereof will be appropriately omitted.

The imaging element 22K illustrated in FIG. 18 has the same configuration as that of the imaging element 22B illustrated in FIG. 3. The image processing unit 23K illustrated in FIG. 18 is different from the image processing unit 23B illustrated in FIG. 3 in that the distance information generation unit 109 of the image processing unit 23B is replaced with a load detection unit 571.

The load detection unit 571 of the image processing unit 23K illustrated in FIG. 18 detects a load at a predetermined point in time from load information supplied from the outside of the image processing unit 23K. A resolution map creating unit 108K creates a resolution map on the basis of the load detected by the load detection unit 571.

Processing performed by the imaging element 22K and the image processing unit 23K configured in such a manner is basically performed on the basis of the flowchart illustrated in FIG. 6, and thus a description thereof will be omitted. However, in step S101, distance information is generated, but there is a difference in that this process is replaced with a process of detecting a load.

For example, the load detection unit 571 acquires a congestion state of a network as load information through the communication unit 30 (FIG. 1), and a resolution of a captured image is set to be low in order to reduce the amount of imaging data input through the network in a case in which it is determined that the network is congested.

In addition, for example, the load detection unit 571 acquires a processing load of the captured image processing unit 121 as load information, and a resolution of a captured image to be imaged and processed by the imaging element 22K is set to be low in order to reduce the amount of imaging data to be input to the captured image processing unit 121, in other words, imaging data to be supplied from the imaging element 22K in a case in which it is determined that a processing load of the captured image processing unit 121 is increasing.

A processing load within the imaging device 10 is acquired, and the measured information may be acquired as load information.

Note that, here, a description has been given on the assumption that a resolution is lowered when a processing load is increased, but a process of increasing a resolution may be performed when there is a margin in the processing load.

Basically, setting is performed in accordance with such a load, but it is also possible to set a resolution in combination with a distance to a subject. For example, it is also possible to set a resolution in accordance with a distance to a subject and to set a resolution in accordance with detection of a load.

When there is a margin in a case in which a processing load within the imaging device 10 is low, a case in which a network is not congested, or the like, it is not necessary to lower a resolution, and thus a resolution is set to be a high resolution (setting for lowering a thinning-out rate and not performing thinning-out is performed), so that a high-quality image is output in all regions within the image.

When a load within the imaging device 10 or a load of a network is high and it is necessary to lower a resolution, the amount of data of an image is reduced by setting a high resolution for a subject in a distant view and setting a low resolution for a subject in a near view, for example, like the above-described change of a resolution based on a distance.

In this manner, it is possible to prevent unnecessary degradation of a resolution and deterioration of image quality even when there is a margin in resources.

In this manner, it is possible to keep detection robust by changing a resolution in accordance with a distance without uniformly lowering a resolution within an image when a load is high.

Note that, in a case in which a resolution is set using not only a result of load detection but also a distance, a configuration can be adopted in which the above-described processing is executed by adding the distance information acquisition unit 131 and the distance information generation unit 109 to the configuration illustrated in FIG. 18.

<Change of Resolution Based on Determination of Resolution>

Next, a case in which a resolution is determined by an algorithm to be applied to a latter stage and a resolution is changed on the basis of the determined resolution will be described as an example of a case in which a resolution is changed on the basis of information other than a distance.

Figure 19:
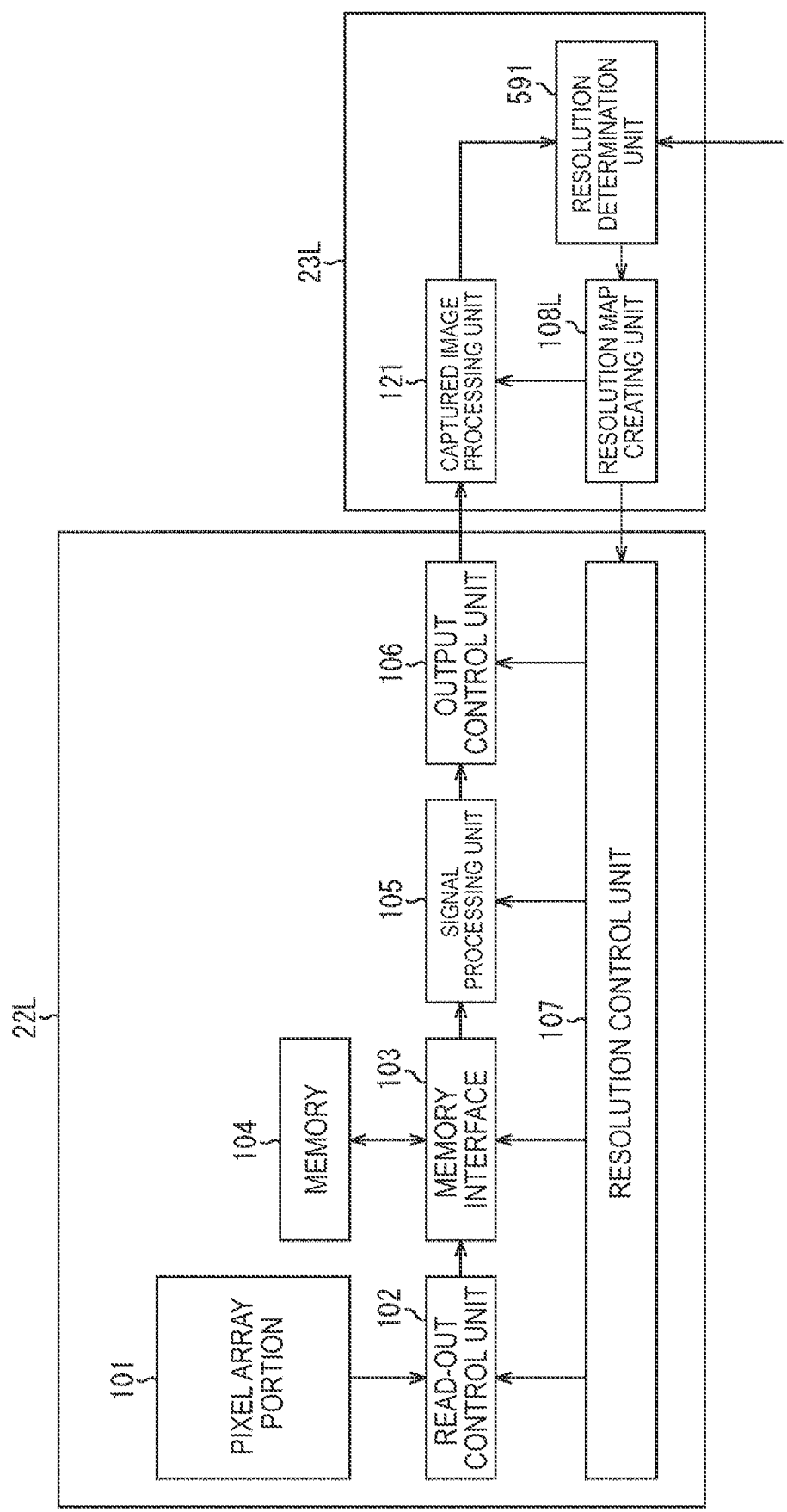
FIG. 19 is a diagram illustrating another configuration example of each of an imaging element and an image processing unit.

FIG. 19 is a diagram illustrating configuration examples of an imaging element 22L and an image processing unit 23L when adopting a configuration in which a resolution is changed on the basis of an algorithm to be applied to a latter stage. In a configuration of each of the imaging element 22L and the image processing unit 23L illustrated in FIG. 19 and a configuration of each of the imaging element 22B and the image processing unit 23B illustrated in FIG. 3, the same components are denoted by the same reference numerals and signs, and a description thereof will be appropriately omitted.

The imaging element 22L illustrated in FIG. 19 has the same configuration as that of the imaging element 22B illustrated in FIG. 3. The image processing unit 23L illustrated in FIG. 19 is different from the image processing unit 23B illustrated in FIG. 3 in that the distance information generation unit 109 of the image processing unit 23B is replaced with a resolution determination unit 591.

The resolution determination unit 591 of the image processing unit 23L illustrated in FIG. 19 determines a resolution from resolution determination information supplied from the outside of the image processing unit 23L. A resolution map creating unit 108L creates a resolution map on the basis of the resolution determined by the resolution determination unit 591.

A process performed by the imaging element 22L and the image processing unit 23L having such a configuration is basically performed on the basis of the flowchart illustrated in FIG. 6, and thus a description thereof will be omitted. However, although distance information is generated in step S101, but there is a difference in that this process is replaced with a process of determining a resolution.

For example, the resolution determination unit 591 determines a resolution satisfying a resolution required by an algorithm in a latter stage. The algorithm in the latter stage is, for example, face recognition, moving body detection, or the like.

In a case in which the algorithm in the latter stage is face recognition, the determination of a resolution for setting a high resolution for a region detected as a face and setting a low resolution for other regions is performed. In addition, for example, in a case in which the algorithm in the latter stage is detection of a moving body, the determination of a resolution for setting a high resolution for a region detected as a moving body and setting a low resolution for other regions is performed.

The resolution determination unit 591 acquires resolution determination information indicating to what extent the algorithm in the latter stage requires a resolution from the outside to determine a resolution. In addition, the resolution determination unit 591 stores a table in which an algorithm and a resolution are associated with each other, and may determine a resolution with reference to the table.

Basically, setting is performed in accordance with such a determination of a resolution, but it is also possible to set a resolution in combination with a distance to a subject. For example, it is also possible to set a resolution in accordance with a distance to a subject and to set a resolution in accordance with detection of a determination of a resolution.

A resolution of a subject in a distant view is set to be high and a resolution of a subject in a near view is set to be low, for example, like the above-described change of a resolution based on a distance. A resolution is set in this manner, and thus it is possible to detect a subject in a distant view without losing sight of the subject and to reduce the amount of data in a near view.

Further, even in a near view such as a case in which the algorithm in the latter stage is an algorithm using an edge as important information such as segmentation (region division), a resolution in a region in the vicinity of the edge may be set to be high.

In addition, even in a near view such as a case in which the algorithm in the latter stage is an algorithm using the texture of a subject as important information, a resolution in a region of the subject may be set to be high. In addition, it is also possible to lower a resolution as necessary such as a case in which the algorithm in the latter stage is an algorithm requiring imaging data less influenced by noise.

Note that an example is described here. The present technology can be applied in a case in which a resolution is changed within a range in which a resolution required by an algorithm (application) is maintained.

A resolution is changed in this manner, so that the detection of a small object in the distance is also robust and it is possible to generate and supply data appropriate for the algorithm in the latter stage (application) while reducing the amount of data by thinning out a near view, whereby it is possible to realize the acquisition of efficient imaging data.

Note that, in a case in which a resolution is set using not only a result of resolution determination detection but also a distance, a configuration can be adopted in which the above-described processing is executed by adding the distance information acquisition unit 131 and the distance information generation unit 109 to the configuration illustrated in FIG. 19.

<Change of Resolution Based on Lens>

Next, a case in which a resolution is changed on the basis of the type of lens group 21 (FIG. 1) of the imaging device 10 will be described as an example of a case in which a resolution is changed on the basis of information other than a distance.

For example, as read-out in a case in which a lens having a shallow depth of field is mounted, a high resolution is set for a region at a distance in the vicinity of a main subject, and a low resolution is set for regions (regions in which a blur occurs in the lens) at the other distances.

A resolution is set in this manner, and thus it is possible to efficiently read out the other original regions in which a blur occurs in the lens with a low resolution, while obtaining a resolution of a main subject.

<Configuration in which Two or More Images are Output>

Incidentally, for example, according to the configuration of the image processing unit 23D illustrated in FIG. 9, image data of an image having an adjusted resolution is supplied from the imaging element 22D to the image processing unit 23D. The moving body detection unit 431 detects a moving body using an image supplied from the captured image processing unit 121, in other words, an image supplied to the image processing unit 23D.

With such a configuration, the moving body detection unit 431 detects a moving body using an image having an adjusted resolution, and thus the moving body detection unit 431 processes an image having an unfixed resolution such as when a moving body is detected using an image having a high resolution or when a moving body is detected using an image having a low resolution. Thus, there is a likelihood that the accuracy of detection of a moving body may not be stabilized due to the moving body detection unit 431.

Figure 20:
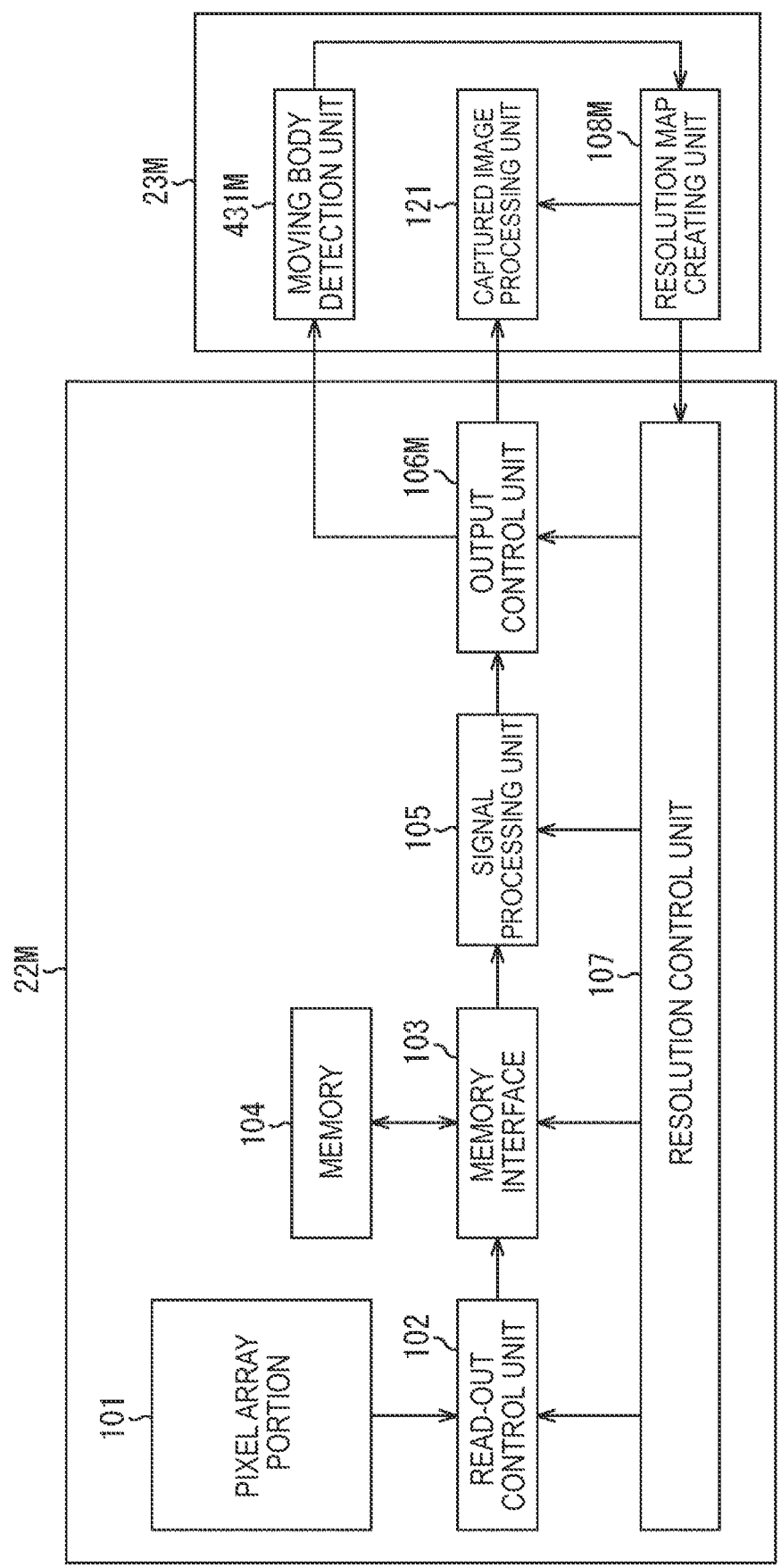
FIG. 20 is a diagram illustrating another configuration example of each of an imaging element and an image processing unit.

Consequently, configurations of an imaging element 22M and an image processing unit 23M may be adopted as a configuration as illustrated in FIG. 20. The imaging element 22M illustrated in FIG. 20 basically has the same configuration as that of the imaging element 22B illustrated in FIG. 3, but there is a difference in that an output control unit 106M is configured to output N streams. For example, the output control unit 106M is configured to be capable of outputting streams of image data having different resolutions in parallel.

The output control unit 106M outputs an image having a predetermined resolution, for example, resolution such as VGA to a moving body detection unit 431M of the image processing unit 23M, as streams of image data having different resolutions. An image to be supplied to the moving body detection unit 431M is an image which is not controlled by the resolution control unit 107 and has a fixed resolution at all times.

In addition, the output control unit 106M outputs an image having a changed resolution to a captured image processing unit 121 of the image processing unit 23M as streams of image data having different resolutions by receiving an instruction from the resolution control unit 107.

In a case in which the imaging element 22M is configured in such a manner, the moving body detection unit 431M receives the supply of an image having a fixed resolution from the output control unit 106M of the imaging element 22M and detects a moving body using the image. Accordingly, it is possible to stably detect the moving body.

In addition, an image having a changed resolution is supplied to the captured image processing unit 121 in accordance with an instruction given from the resolution control unit 107, and thus it is possible to receive image data of which the amount of data is appropriately reduced.

In this manner, a plurality of streams are output from the imaging element 22M. One of the streams can be set to be a stream of an image of which the resolution has not been changed, and another stream can be set to be a stream of an image of which the resolution has been changed.

In addition, an image of which the resolution has not been changed is provided, and thus it is possible to perform stable processing, for example, the detection of a moving body.

Note that, here, although the imaging device 10 performing detection of a moving body illustrated in FIG. 9 has been described as an example, a structure in which a plurality of streams are output and processed can be applied to the imaging device 10 illustrated in FIGS. 10 to 19. Further, for example, in the image processing unit 23B within) the imaging device 10 illustrated in FIG. 3, a structure in which a plurality of streams are output and processed can also be applied to a case in which distance information is generated using an image obtained from the imaging element 22B.

Usage Example

Figure 21:
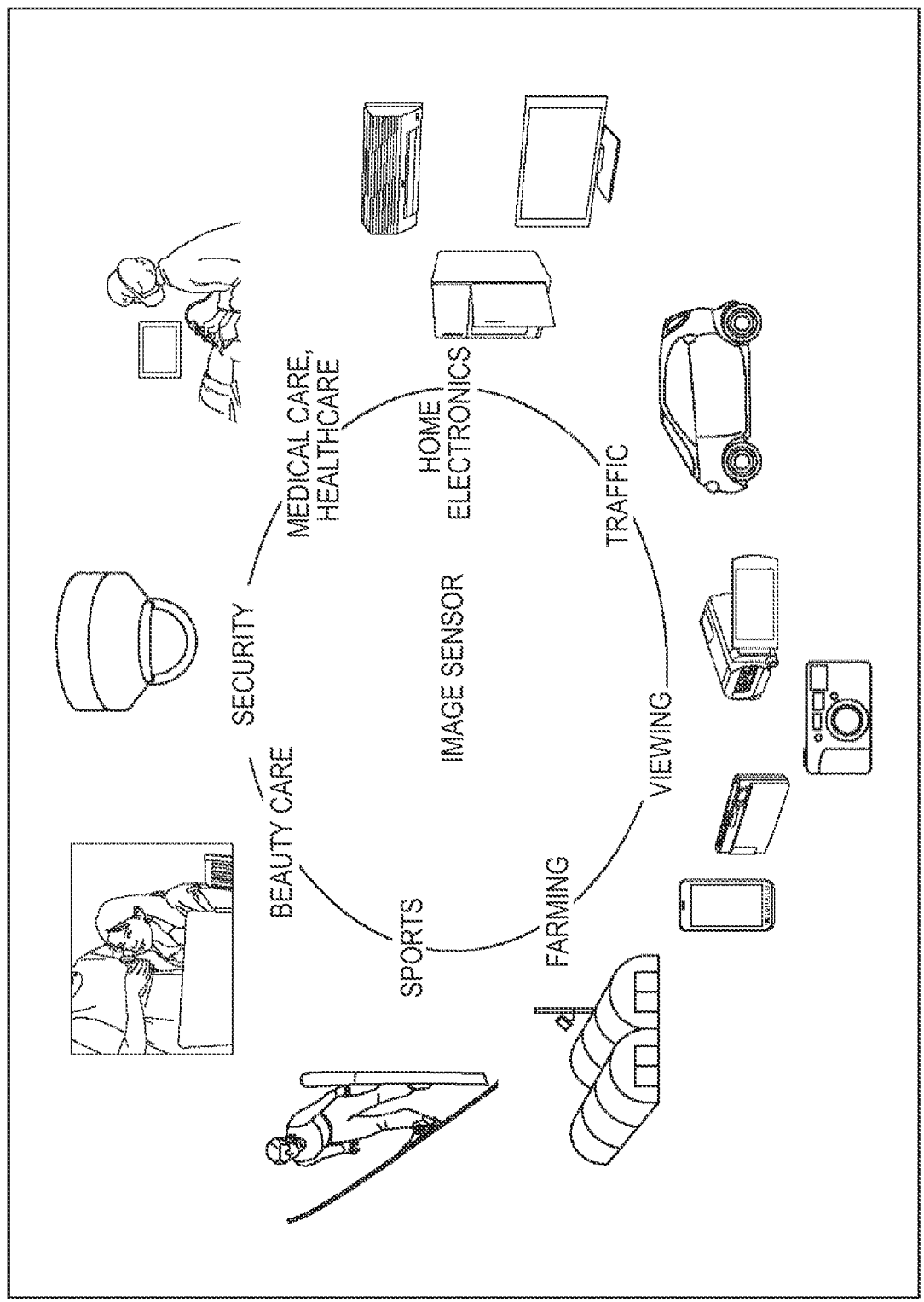
FIG. 21 is a diagram illustrating an example of use of an imaging element.

FIG. 21 is a diagram illustrating a usage example of the above-described imaging device 1.

The imaging device can be, for example, used in various cases in which light such as visible light, infrared light, ultraviolet light and X-ray is sensed as described below.

- Devices that take images used for viewing, such as a digital camera and a portable appliance with a camera function.
- Devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.
- Devices used for home electrical appliances, such as a TV, a refrigerator, and an air conditioner, to takes images of a gesture of a user and perform appliance operation in accordance with the gesture.
- Devices used for medical care and health care, such as an endoscope and a device that performs angiography by reception of infrared light.
- Devices used for security, such as a monitoring camera for crime prevention and a camera for personal authentication.
- Devices used for beauty care, such as skin measurement equipment that takes images of the skin and a microscope that takes images of the scalp.
- Devices used for sports, such as an action camera and a wearable camera for sports and the like.
- Devices used for agriculture, such as a camera for monitoring the condition of the field.

<Recording Medium>

A series of processes described above can be executed by hardware or software. When a series of processes is executed by software, a program constituting the software is installed in a computer. Here, examples of the computer include a computer incorporated in dedicated hardware and a general-purpose personal computer which is capable of executing various kinds of functions when various kinds of programs are installed therein.

Figure 22:
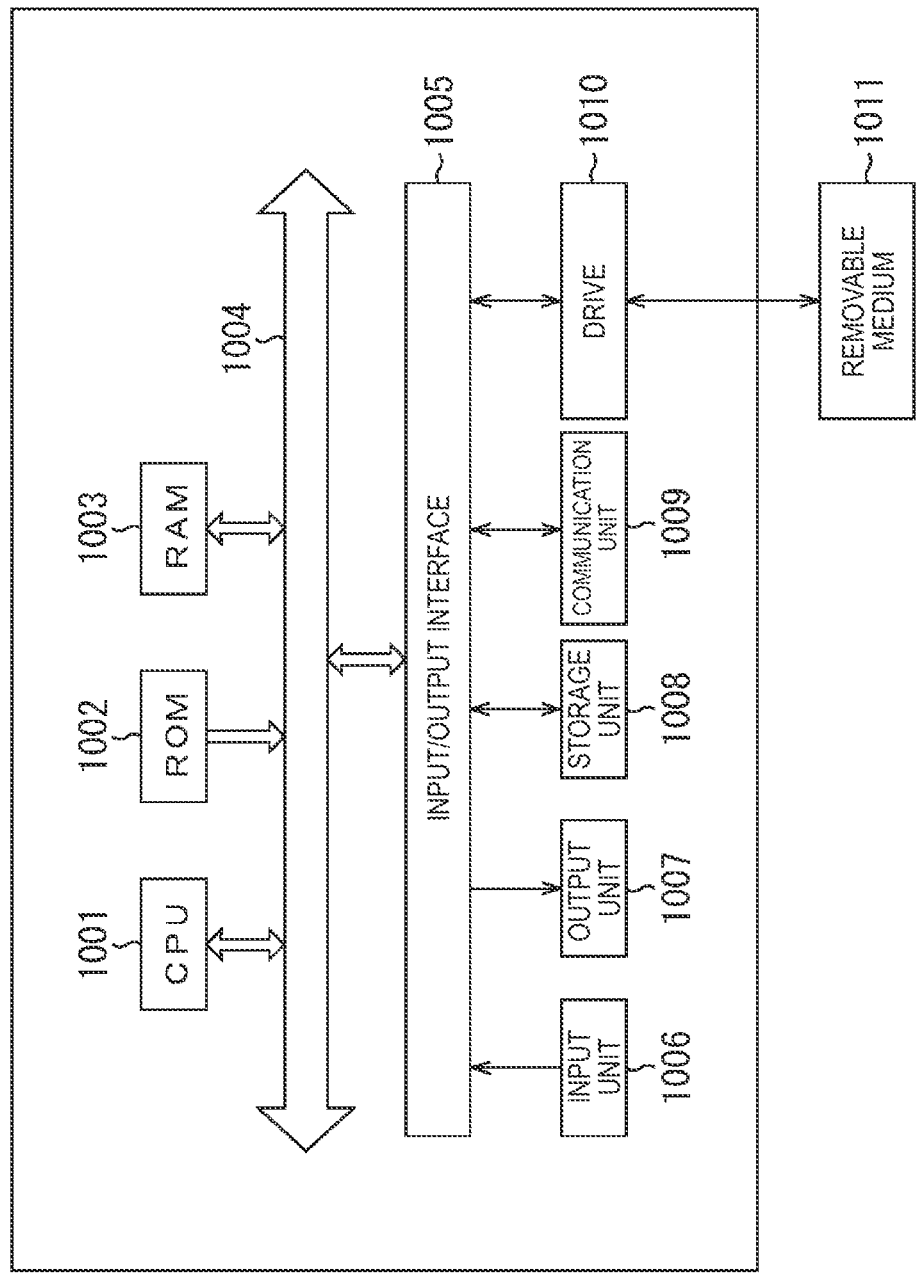
FIG. 22 is a diagram illustrating a recording medium.

FIG. 22 is a block diagram illustrating an exemplary hardware configuration of a computer that executes a series of processing described above by a program. In a computer, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The storage unit 1008 includes a hard disk, a nonvolatile memory, or the like. The communication unit 1009 includes a network interface or the like. The drive 1010 drives a removable medium 1011 such as a magnetic disk, an optical disk, a magneto-optical disk, or a semiconductor memory.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by the computer may be a program that is processed in time series according to the sequence described in this specification or a program that is processed in parallel or at necessary timing such as upon calling.

Also, in this specification, the term "system" represents the totality of an apparatus composed of a plurality of apparatus.

Note that the effects described in the present specification are not limiting but are merely examples, and there may be additional effects.

Note that an embodiment of the disclosure is not limited to the embodiments described above, and various changes and modifications may be made without departing from the scope of the disclosure.

Additionally, the present technology may also be configured as below.

(1)

An imaging device including:

a control unit which changes a resolution of a captured image on the basis of distance information, corresponding to the captured image, regarding a detected distance to a subject included in the image.

(2)

The imaging device according to (1), in which the control unit changes a resolution of a portion of a region of the captured image on the basis of the distance information.

(3)

The imaging device according to (2), in which the portion of the region is a region distant from another region, and the control unit changes the resolution of the portion of the region such that the portion of the region becomes higher than a resolution of another region.

(4)
The imaging device according to any of (1) to (3), in which the control unit sets a resolution of the subject to be high in a case in which the distance to the subject is longer than a predetermined reference, and sets the resolution of the subject to be low in a case in which the distance to the subject is smaller than the predetermined reference.

(5)
The imaging device according to any of (1) to (4), in which the control unit controls the resolution on the basis of the distance information of a moving body detected in the captured image.

(6)
The imaging device according to any of (1) to (4), in which the control unit controls the resolution on the basis of the distance information of a person detected in the captured image.

(7)
The imaging device according to any of (1) to (4), in which the control unit controls the resolution on the basis of a size of the subject detected in the captured image and the distance information.

(8)
The imaging device according to any of (1) to (4), in which the control unit controls the resolution on the basis of texture detected in the captured image and the distance information.

(9)
The imaging device according to any of (1) to (4), in which the control unit controls the resolution on the basis of a type of the subject detected in the captured image and the distance information.

(10)
The imaging device according to any of (1) to (4), in which the control unit controls the resolution on the basis of an amount of movement of the subject detected in the captured image and the distance information.

(11)
The imaging device according to any of (1) to (4), in which the control unit controls the resolution on the basis of a moving direction of the subject detected in the captured image and the distance information.

(12)
The imaging device according to any of (1) to (4), in which the control unit controls a resolution in accordance with the distance information and a processing load.

(13)
The imaging device according to any of (1) to (4), in which the control unit controls a resolution in accordance with the distance information and an algorithm for performing a process using the image.

(14)
The imaging device according to any of (1) to (4), in which the control unit controls a resolution in accordance with the distance information and a mounted lens.

(15)
The imaging device according to any of (1) to (14), in which an image of which the resolution is controlled by the control unit and an image having a fixed resolution are output.

(16)
The imaging device according to any of (1) to (15), in which the control unit changes a resolution by changing a thinning-out rate of pixel read-out.

(17)
The imaging device according to (16), in which a process of lowering a resolution by thinning out pixels within a predetermined region is performed by adding pixel values of pixels having a same color and dividing a value obtained by the addition by the number of pixels in the addition.

(18)
The imaging device according to any of (1) to (17), further including:
an imaging unit which captures the image.

(19)
An imaging method including:
a step of changing a resolution of a captured image on the basis of distance information, corresponding to the captured image, regarding a detected distance to a subject included in the image.

(20)
A program causing a computer to execute a process including:
a step of changing a resolution of a captured image on the basis of distance information, corresponding to the captured image, regarding a detected distance to a subject included in the image.

REFERENCE SIGNS LIST

10 imaging device
21 lens group
22 imaging element
23 image processing unit
24 frame memory
25 display unit
26 recording unit
27 operation unit
28 power supply
29 driving unit
30 communication unit
31 bus line
101 pixel array portion
102 read-out control unit
103 memory interface
104 memory
105 signal processing unit
106 output control unit
107 resolution control unit
108 resolution map creating unit
109 distance information generation unit
121 captured image processing unit
131 distance information acquisition unit
431 moving body detection unit
451 person detection unit
471 size detection unit
491 texture detection unit
511 type detection unit
531 movement amount detection unit
551 moving direction determination unit
571 load detection unit
591 resolution determination unit

The invention claimed is:
1. An information processing device comprising:
circuitry configured to:
acquire a captured image that includes a subject;
acquire distance information indicating a distance to the subject included in the captured image;

reduce an amount of data corresponding to a portion of the captured image based on the distance information indicating the distance to the subject included in the captured image;

generate a resolution map indicating resolution information for the captured image; and change a resolution of the portion of the captured image based on the resolution map.

2. The information processing device according to claim 1, wherein
the circuitry is further configured to change the resolution of the portion of the captured image to reduce the amount of data corresponding to the portion of the captured image.

3. The information processing device according to claim 1, wherein
the circuitry is further configured to acquire the distance information indicating the distance to the subject by generation of a depth map indicating the distance information based on the captured image and reduce the amount of data corresponding to the portion of the captured image based on the depth map.

4. The information processing device according to claim 1, wherein
the captured image in which resolution is controlled by the circuitry and an image having a fixed resolution are output.

5. The information processing device according to claim 2, wherein
the subject is a moving body detected in the captured image, and
the circuitry is further configured to change the resolution of the portion of the captured image on a basis of the distance information of the moving body detected in the captured image.

6. The information processing device according to claim 2, wherein
the subject is a person detected in the captured image, and
the circuitry is further configured to change the resolution of the portion of the captured image on a basis of the distance information of the person detected in the captured image.

7. The information processing device according to claim 2, wherein
the circuitry is further configured to change the resolution of the portion of the captured image on a basis of a size of the subject detected in the captured image.

8. The information processing device according to claim 2, wherein
the circuitry is further configured to change the resolution of the portion of the captured image on a basis of a texture detected in the captured image.

9. The information processing device according to claim 2, wherein
the circuitry is further configured to change the resolution of the portion of the captured image on a basis of a type of the subject detected in the captured image.

10. The information processing device according to claim 2, wherein
the circuitry is further configured to change the resolution of the portion of the captured image on a basis of an amount of movement of the subject detected in the captured image.

11. The information processing device according to claim 2, wherein
the circuitry is further configured to change the resolution of the portion of the captured image on a basis of a moving direction of the subject detected in the captured image.

12. The information processing device according to claim 2, wherein
the circuitry is further configured to change the resolution of the portion of the captured image in accordance with the distance information and a processing load.

13. The information processing device according to claim 2, wherein
the circuitry is further configured to change the resolution of the portion of the captured image in accordance with the distance information and an algorithm for performing a process using the captured image.

14. The information processing device according to claim 2, wherein
the circuitry is further configured to change the resolution of the portion of the captured image in accordance with the distance information and a mounted lens.

15. The information processing device according to claim 2, wherein
the circuitry is further configured to change the resolution of the portion of the captured image by changing a thinning-out rate of a pixel read-out.

16. The information processing device according to claim 2, wherein
the circuitry is further configured to lower the resolution of the captured image by thinning out pixels within the portion of the captured image that includes the subject by adding pixel values of pixels having a same color and dividing a value obtained by the adding by a number of pixels in the adding.

17. A method performed in an information processing device, the method comprising:
acquiring a captured image including a subject;
acquiring distance information indicating a distance to the subject included in the captured image;
reducing an amount of data corresponding to a portion of the captured image based on the distance information indicating the distance to the subject included in the captured image;
generating a resolution map indicating resolution information for the captured image, and
changing a resolution of the portion of the captured image based on the resolution map.

18. A non-transitory computer readable medium having instructions stored therein, which when executed by a processor in an information processing device cause the processor to execute a method comprising:
acquiring a captured image including a subject;
acquiring distance information indicating a distance to the subject included in the captured image;
reducing an amount of data corresponding to a portion of the captured image based on the distance information indicating the distance to the subject included in the captured image;
generating a resolution map indicating resolution information for the captured image, and
changing a resolution of the portion of the captured image based on the resolution map.

* * * * *